(12) United States Patent
Li et al.

(10) Patent No.: US 11,289,069 B2
(45) Date of Patent: Mar. 29, 2022

(54) STATISTICAL PARAMETER MODEL ESTABLISHING METHOD, SPEECH SYNTHESIS METHOD, SERVER AND STORAGE MEDIUM

(71) Applicant: Tencent Technology (Shenzhen) Company Limited, Shenzhen (CN)

(72) Inventors: Wei Li, Shenzhen (CN); Hangyu Yan, Shenzhen (CN); Ke Li, Shenzhen (CN); Yongjian Wu, Shenzhen (CN); Feiyue Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 336 days.

(21) Appl. No.: 16/365,458

(22) Filed: Mar. 26, 2019

(65) Prior Publication Data

US 2019/0221202 A1    Jul. 18, 2019

Related U.S. Application Data

(63) Continuation of application No. PCT/CN2018/083037, filed on Apr. 13, 2018.

(30) Foreign Application Priority Data

Apr. 19, 2017    (CN) .......................... 201710258873.6

(51) Int. Cl.
*G10L 13/10* (2013.01)
*G10L 13/08* (2013.01)
(Continued)

(52) U.S. Cl.
CPC .............. *G10L 13/10* (2013.01); *G06F 17/16* (2013.01); *G06N 7/00* (2013.01); *G10L 13/047* (2013.01); *G10L 13/08* (2013.01)

(58) Field of Classification Search
CPC ................................ G10L 13/08; G10L 13/10
(Continued)

(56) References Cited

U.S. PATENT DOCUMENTS

| 8,527,276 B1 | 9/2013 | Senior et al. |
| 2015/0186359 A1* | 7/2015 | Fructuoso ............... G10L 13/08 704/8 |
| 2016/0343366 A1 | 11/2016 | Fructuoso et al. |

FOREIGN PATENT DOCUMENTS

| CN | 103578462 A | 2/2014 |
| CN | 105206264 A | 12/2015 |

(Continued)

OTHER PUBLICATIONS

Chen et al. ("An RNN-Based Prosodic Information Synthesizer for Mandarin Text-to-Speech" IEEE Transactions on Speech and Audio Processing, vol. 6, No. 3, May 1998.*
(Continued)

*Primary Examiner* — Farzad Kazeminezhad
(74) *Attorney, Agent, or Firm* — Morgan, Lewis & Bockius LLP

(57) ABSTRACT

A statistical parameter modeling method is performed by a server. After obtaining model training data, the model training data including a text feature sequence and a corresponding original speech sample sequence, the server inputs an original vector matrix formed by matching a text feature sample point in the text feature sample sequence with a speech sample point in the original speech sample sequence into a statistical parameter model for training and then performs non-linear mapping calculation on the original vector matrix in a hidden layer, to output a corresponding prediction speech sample point. The server then obtains a model parameter of the statistical parameter model according to the prediction speech sample point and a correspond- (Continued)

ing original speech sample point by using a smallest difference principle, to obtain a corresponding target statistical parameter model.

14 Claims, 14 Drawing Sheets

(51) Int. Cl.
*G06N 7/00* (2006.01)
*G06F 17/16* (2006.01)
*G10L 13/047* (2013.01)

(58) Field of Classification Search
USPC .............................................................. 704/8
See application file for complete search history.

(56) References Cited

FOREIGN PATENT DOCUMENTS

| CN | 105374350 A | 3/2016 |
|---|---|---|
| CN | 105529023 A | 4/2016 |
| CN | 105654939 A | 6/2016 |
| CN | 105654940 A | 6/2016 |
| CN | 105788588 A | 7/2016 |
| CN | 106971709 A | 7/2017 |
| EP | 2860725 A1 | 4/2015 |
| GB | 201416303 | 10/2014 |
| WO | WO 2015191651 A1 | 12/2015 |
| WO | WO 2015191968 A1 | 12/2015 |

OTHER PUBLICATIONS

Tencent Technology, WO, PCT/CN2018/083037, Aug. 13, 2018, 5 pgs.
Tencent Technology, IPRP, PCT/CN2018/083037, Oct. 22, 2019, 6 pgs.
Tencent Technology, ISR, PCT/CN2018/083037, Aug. 13, 2018, 2 pgs.
Extended European Search Report, EP18788138,8 dated Mar. 31, 2020, 10 pgs.
Heiga Zen et al., "Statistical Parametric Speech Synthesis Using Deep Neural Networks", 2013 IEEE International Conference on Acoustics, Speech and Signal Processing, Oct. 21, 2013, 5 pgs.

\* cited by examiner

STATISTICAL PARAMETER MODEL ESTABLISHING METHOD, SPEECH SYNTHESIS METHOD, SERVER AND STORAGE MEDIUM

CROSS-REFERENCE TO RELATED APPLICATIONS

This application is a continuation application of PCT/CN2018/083037, entitled "STATISTICAL PARAMETER MODEL ESTABLISHMENT METHOD, SPEECH SYNTHESIS METHOD, SERVER AND STORAGE MEDIUM" filed on Apr. 13, 2018, which claims priority to Chinese Patent Application No. 201710258873.6, entitled "STATISTICAL PARAMETER MODELING METHOD AND APPARATUS, AND SPEECH SYNTHESIS METHOD AND APPARATUS" filed with the Chinese Patent Office on Apr. 19, 2017, all which are incorporated by reference in their entirety.

FIELD OF THE TECHNOLOGY

This application relates to the field of speech technologies, and in particular, to a statistical parameter modeling method, a speech synthesis method, a server, and a storage medium.

BACKGROUND OF THE DISCLOSURE

A text to speech (TTS) system includes two modules: a front end module and a backend module, for converting, through a series of analysis and modeling, a piece of text content into a speech file that can be played and stored. The front end mainly processes text content, and converts the text content into different forms of intermediate expression states, for instructing a backend to convert the text content into corresponding speech. One type of backend module is statistical parameter model. The statistical parameter model is a model for modeling a mode of a sounding mechanism.

A statistical parameter model in a conventional technology needs to extract, from speech, features such as a pitch frequency having a closest relationship with sounding, sounding duration, and a spectrum characteristic, and then performs modeling on the extracted speech features. During speech synthesis, the statistical parameter model in the conventional technology first synthesizes a predicted pitch frequency, sounding duration, and spectrum characteristic, and then recombines the obtained speech features into a speech waveform by using a backend signal processing module. However, the statistical parameter model in the conventional technology needs to convert original speech when extracting the features, and information loss is easily caused during the speech conversion. The information loss makes synthesized timbre not full enough and have disadvantages such as obvious machine voice.

SUMMARY

According to embodiments of this application, a statistical parameter modeling method, a speech synthesis method, a server, and a storage medium are provided.

A statistical parameter modeling method includes:
obtaining, by a server, model training data, the model training data including a text feature sequence and a corresponding original speech sample sequence;
inputting, by the server, an original vector matrix formed by matching a text feature sample point in the text feature sample sequence with a speech sample point in the original speech sample sequence into a statistical parameter model for training;
performing, by the server, non-linear mapping calculation on the original vector matrix in a hidden layer, to output a corresponding prediction speech sample point; and
determining, by the server, a model parameter of the statistical parameter model according to the prediction speech sample point and a corresponding original speech sample point by using a smallest difference principle, to obtain a corresponding target statistical parameter model.

A server includes a memory and a processor, the memory storing a computer-readable instruction, and when executed by the processor, the computer-readable instruction causing the processor to perform the following steps:
obtaining model training data, the model training data including a text feature sequence and a corresponding original speech sample sequence;
inputting an original vector matrix formed by matching a text feature sample point in the text feature sample sequence with a speech sample point in the original speech sample sequence into a statistical parameter model for training;
performing non-linear mapping calculation on the original vector matrix in a hidden layer, to output a corresponding prediction speech sample point; and
determining a model parameter of the statistical parameter model according to the prediction speech sample point and a corresponding original speech sample point by using a smallest difference principle, to obtain a corresponding target statistical parameter model.

A non-volatile computer readable storage medium stores a computer-readable instruction, when executed by one or more processors, the computer-readable instruction causing the one or more processors to perform the following steps:
obtaining model training data, the model training data including a text feature sequence and a corresponding original speech sample sequence;
inputting an original vector matrix formed by matching a text feature sample point in the text feature sample sequence with a speech sample point in the original speech sample sequence into a statistical parameter model for training;
performing non-linear mapping calculation on the original vector matrix in a hidden layer, to output a corresponding prediction speech sample point; and
determining a model parameter of the statistical parameter model according to the prediction speech sample point and a corresponding original speech sample point by using a smallest difference principle, to obtain a corresponding target statistical parameter model.

A speech synthesis method includes:
obtaining, by a server, to-be-converted text information;
processing, by the server, the to-be-converted text information to obtain a corresponding text feature sequence;
obtaining, by the server, an initialized speech sample point and some text feature sample points in the text feature sequence, and matching the initialized speech sample point with the text feature sample points to form an initialized vector matrix;
inputting, by the server, the initialized vector matrix into the target statistical parameter model in any of the foregoing embodiments, to obtain a prediction speech sample point sequence corresponding to the text feature sequence; and
outputting, by the server, synthesized speech corresponding to the to-be-converted text information according to the prediction speech sample point sequence.

A server includes a memory and a processor, the memory storing a computer-readable instruction, and when executed by the processor, the computer-readable instruction causing the processor to perform the following steps:

obtaining to-be-converted text information;

processing the to-be-converted text information to obtain a corresponding text feature sequence;

obtaining an initialized speech sample point and some text feature sample points in the text feature sequence, and matching the initialized speech sample point with the text feature sample points to form an initialized vector matrix;

inputting the initialized vector matrix into the target statistical parameter model in any one of the foregoing embodiments, to obtain a prediction speech sample point sequence corresponding to the text feature sequence; and outputting synthesized speech corresponding to the to-be-converted text information according to the prediction speech sample point sequence.

A non-volatile computer readable storage medium stores a computer-readable instruction, when executed by one or more processors, the computer-readable instruction causing the one or more processors to perform the following steps:

obtaining to-be-converted text information;

processing the to-be-converted text information to obtain a corresponding text feature sequence;

obtaining an initialized speech sample point and some text feature sample points in the text feature sequence, and matching the initialized speech sample point with the text feature sample points to form an initialized vector matrix;

inputting the initialized vector matrix into the target statistical parameter model in any one of the foregoing embodiments, to obtain a prediction speech sample point sequence corresponding to the text feature sequence; and outputting synthesized speech corresponding to the to-be-converted text information according to the prediction speech sample point sequence.

Details of one or more embodiments of this application are provided in the following accompanying drawings and descriptions. Other features, objectives, and advantages of this application become obvious from this specification, the accompanying drawings, and the claims.

BRIEF DESCRIPTION OF THE DRAWINGS

To describe the technical solutions in the embodiments of this application more clearly, the following briefly describes the accompanying drawings that need to be used in the embodiments. Apparently, the accompanying drawings in the following description show some embodiments of this application, and a person of ordinary skill in the art may derive other drawings from these accompanying drawings without creative efforts.

DESCRIPTION OF EMBODIMENTS

To make the objectives, technical solutions, and advantages of this application clearer, this application is further described in detail below with reference to the accompanying drawings and embodiments. It should be understood that specific embodiments described herein are merely used for illustrating this application and are not intended to limit this application.

Figure 1:
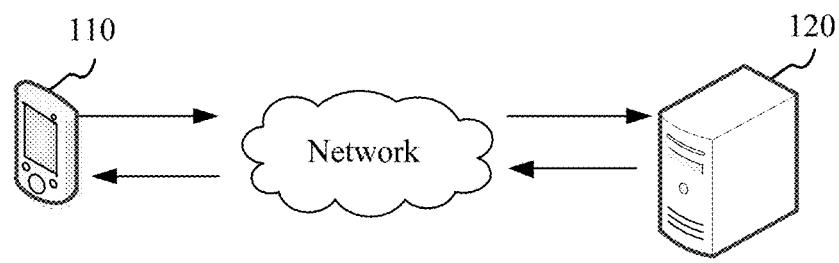
FIG. 1 is a diagram of an application environment of a statistical parameter modeling method and a speech synthesis method according to an embodiment.

FIG. 1 is a diagram of an application environment of a statistical parameter modeling method according to an embodiment. As shown in FIG. 1, the application environment includes a terminal 110 and a server 120. The terminal 110 and the server 120 may communicate with each other by using a network. The terminal 110 sends training data to the server 120. The training data includes a text feature sequence and an original speech sample point sequence corresponding to the text feature sequence. The server 120 trains a statistical parameter model according to the received training data, and compares a training result with the received original speech sample point sequence, to constantly adjust and optimize a model parameter of the statistical parameter model and determine the model parameter of the statistical parameter model, to obtain a corresponding target statistical parameter model and store the corresponding target statistical parameter model in the server 120. The terminal 110 may be, but is not limited to, a smartphone, a tablet computer, a notebook computer, a wearable device, or the like.

In an embodiment, the diagram of the application environment of FIG. 1 may further be applied to a speech synthesis method. The terminal 110 sends, to the server 120, to-be-converted text information that needs to be converted to speech. The server 120 processes the received to-beconverted text information, to obtain a corresponding text feature sequence, samples the obtained text feature sequence to obtain a corresponding text feature sample point sequence, initializes a speech sample point sequence, inputs a vector matrix generated by using the initialized speech sample point and some text feature sample points into a constructed target statistical parameter model to obtain a corresponding prediction speech sample point sequence, generates synthesized speech corresponding to the to-be-converted text information, and sends the synthesized speech to the terminal 110. The terminal 110 plays the received synthesized speech. The terminal 110 may be, but is not limited to, a smartphone, a tablet computer, a notebook computer, a wearable device, or the like.

Figure 2:
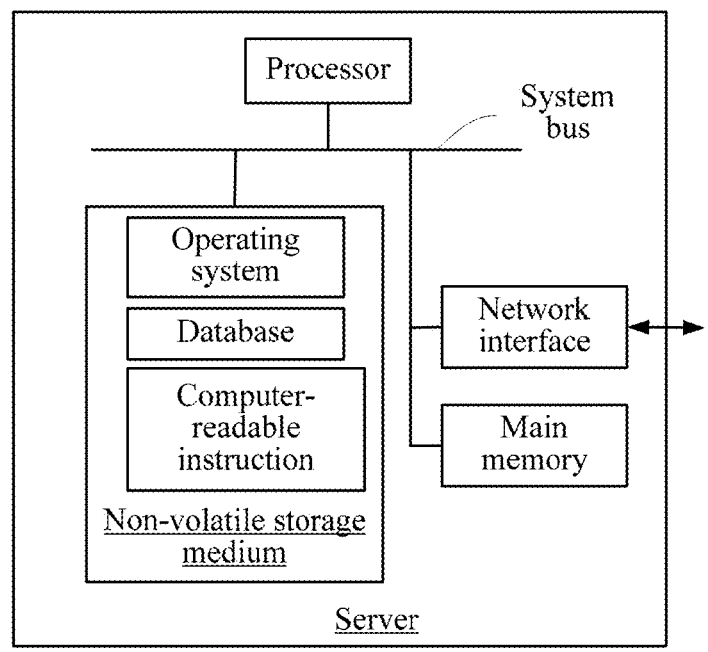
FIG. 2 is a diagram of an internal structure of a server in FIG. 1.

FIG. 2 is a schematic diagram of an internal structure of the server in FIG. 1 according to an embodiment. As shown in FIG. 2, the server includes a processor, a non-volatile storage medium, a main memory, and a network interface that are connected to each other by using a system bus. The non-volatile storage medium of the server stores an operating system and a database, and may further store a computer-readable instruction. When executed by the processor, the computer-readable instruction may cause the processor to implement a statistical parameter modeling method or a speech synthesis method. The processor of the server is configured to provide computing and control capabilities, to support running of the entire server. The main memory of the server may store a computer-readable instruction, and when executed by the processor, the computer-readable instruction may cause the processor to perform a statistical parameter modeling method or a speech synthesis method. The network interface of the server is configured to connect to and communicate with an external terminal by using a network, for example, receive a request sent by the terminal for converting text information into speech information and return output synthesized speech to the terminal. The server may be implemented by using an independent server or a server cluster including a plurality of servers. A person skilled in the art may understand that, the structure shown in FIG. 2 is merely a block diagram of a structure of a part related to a solution of this application, and does not constitute any limitation on the server to which the solution of this application is applied. A specific server may include more or fewer components than those shown in the figure, or some components may be combined, or a different component deployment may be used.

Figure 3:
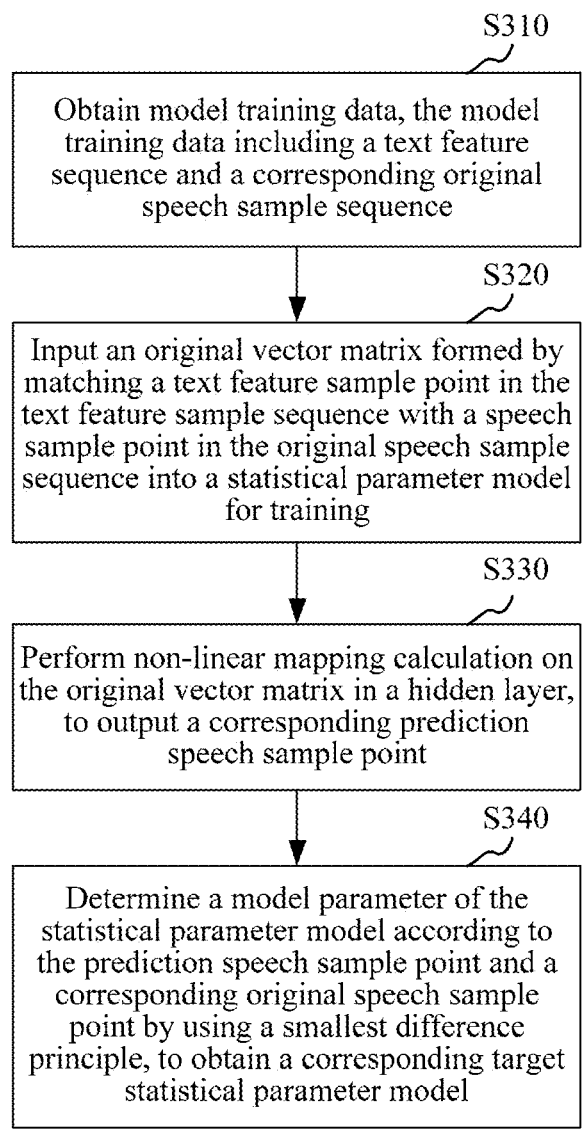
FIG. 3 is a flowchart of a statistical parameter modeling method according to an embodiment.

In an embodiment, a statistical parameter modeling method is provided. This embodiment is described by using an example in which the method is applied to the server 120 in FIG. 1. Referring to FIG. 3, the method specifically includes the following steps:

Step S310. Obtain model training data, the model training data including a text feature sequence and a corresponding original speech sample sequence.

Specifically, the model training data is data used for training a statistical parameter model to determine a model parameter, and includes a text feature sequence and a corresponding original speech sample point sequence. The text feature sequence is a text feature sequence that can instruct sounding and that is obtained after text information that needs to be converted into speech is preprocessed, and may be generated by encoding a text feature that can instruct sounding. The original speech sample sequence is a sequence including original speech sample points, is used for combining with the text feature sequence to obtain a preset speech sample point by using the statistical parameter model, and is compared with an obtained prediction speech sample sequence, to adjust a parameter of the statistical parameter model.

Step S320. Input an original vector matrix formed by matching a text feature sample point in the text feature sample sequence with a speech sample point in the original speech sample sequence into a statistical parameter model for training.

Specifically, the text feature sample sequence is a sequence including a plurality of text feature sample points. The text feature sample points in the text feature sample sequence are in a one-to-one correspondence to sample points in the original speech sample point sequence. A text feature sample point is matched with an original speech sample point to form a vector pair. Vector pairs form an original vector matrix, and the original vector matrix is input into the statistical parameter model, to train the statistical parameter model.

Step S330. Perform non-linear mapping calculation on the original vector matrix in a hidden layer, to output a corresponding prediction speech sample point.

Specifically, the statistical parameter model includes different quantities of hidden layers. A hidden layer is a term in neural network modeling, is an intermediate layer relative to an input layer and an output layer, and can provide better a non-linear modeling capability during modeling. A stronger non-linear modeling capability indicates that speech output by the statistical parameter model is closer to real voice. Further, a value of a quantity of hidden layers is not fixed, and can be adjusted and optimized according to different training data and application scenarios. Generally, the value is between 32 and 512.

After the obtained original vector matrix is input into the statistical parameter model, the original vector matrix participates in the non-linear mapping calculation layer by layer in hidden layers. First, a corresponding input layer node sequence is obtained according to the original vector matrix, then the non-linear mapping calculation is performed on the input layer node sequence to output a hidden layer node sequence corresponding to a first hidden layer, the first hidden layer node sequence is used as an input of the first hidden layer, the non-linear mapping calculation is performed in the first hidden layer to output a hidden layer node sequence corresponding to a second hidden layer, and so on, and the prediction speech sample point corresponding to the original vector matrix is finally obtained in the output layer. A non-linear mapping parameter corresponding to each hidden layer may be different, and a sampling interval of each hidden layer may be different, so that the non-linear mapping and the sampling interval corresponding to each hidden layer can be adjusted, and an accurate prediction speech sample point can be obtained through interval sampling and the non-linear mapping calculation. The original vector matrix includes the text feature sample point and the original speech sample point. A non-linear mapping parameter used when the non-linear mapping calculation is performed on the text feature sample point may be different from a non-linear mapping parameter used when the non-linear mapping is performed on the original speech sample point.

Step S340. Determine a model parameter of the statistical parameter model according to the prediction speech sample point and a corresponding original speech sample point by using a smallest difference principle, to obtain a corresponding target statistical parameter model.

Specifically, the original speech sample point corresponding to the prediction speech sample point is a next original speech sample point of the last original speech sample point in a current original speech sample sequence. The prediction speech sample point is compared with the corresponding original speech sample point by using a back propagation (BP) gradient descent algorithm. The original speech sample point sequence is predicted to obtain a prediction speech sample point $\{o\_t|x\_(t-L), x\_(t-L+1), \ldots x\_(t-1)\}$. A difference between a next sample point of the original speech sample point sequence and predicted speech is obtained through comparison, and the model parameter is updated to narrow the difference. The model parameter of the statistical parameter model is constantly optimized, and a model parameter that makes the difference the smallest is determined by using the smallest difference principle, to obtain the target statistical parameter model.

In this embodiment, in the statistical parameter modeling method, an original vector matrix formed by matching a text feature sample point in a text feature sequence in training data with a speech sample point in an original speech sample sequence is trained by using a statistical parameter model, non-linear mapping calculation is performed on the original vector matrix in a hidden layer, to obtain a corresponding prediction speech sample point, the prediction speech sample point is compared with a corresponding original speech sample point, and a model parameter of the statistical parameter model is determined by using a smallest difference principle, to obtain a corresponding target statistical parameter model. The text feature sequence is directly sampled to obtain the text feature sample point, and the text feature sample point and a speech feature sample point are directly modeled, so that a speech feature does not need to be extracted, and loss of original information caused in a speech feature extraction process is avoided to the greatest extent, thereby improving saturation and naturalness of speech synthesized by using the statistical parameter model.

Figure 4:
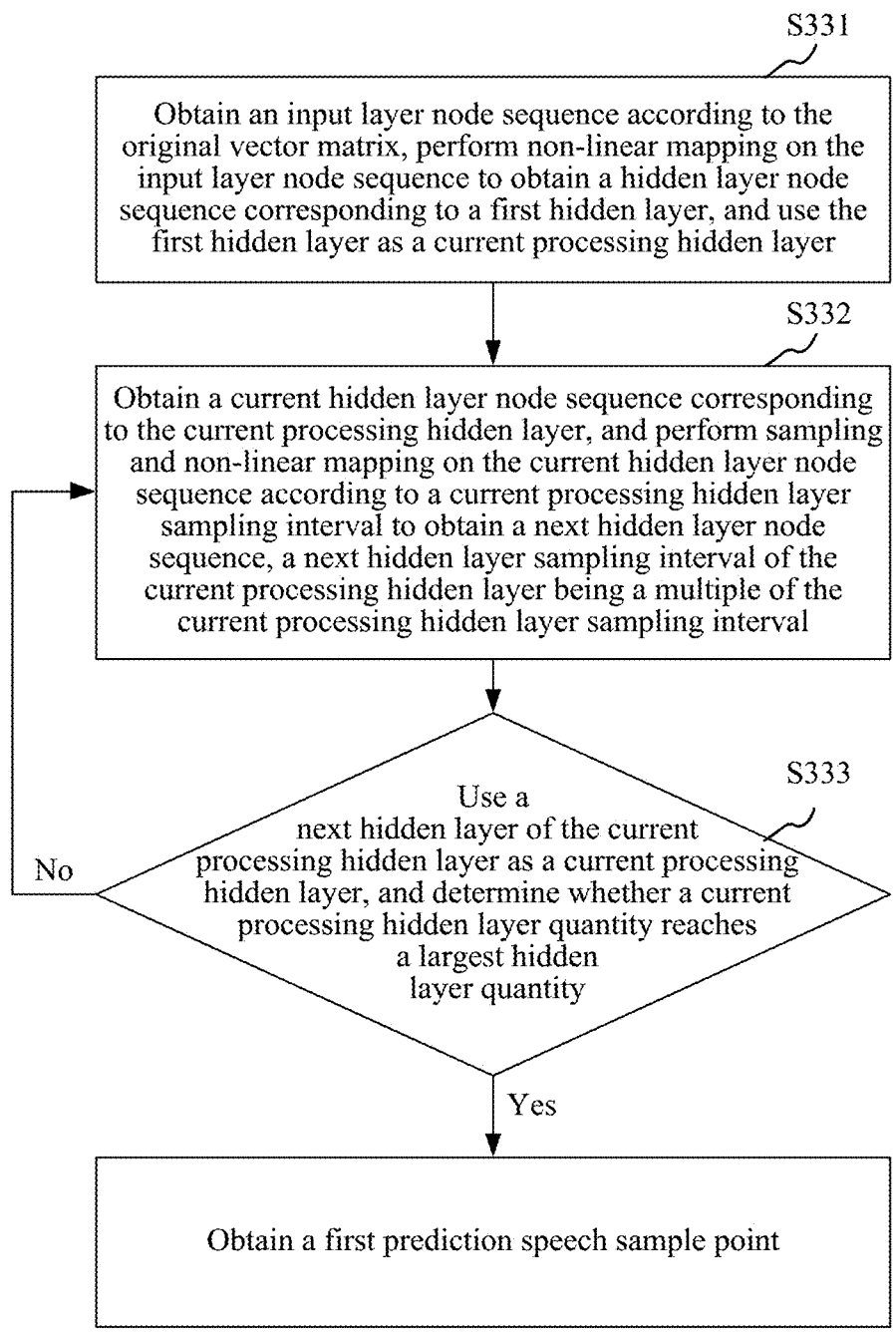
FIG. 4 is a flowchart of steps of obtaining a prediction speech sample point according to an embodiment.

As shown in FIG. 4, in an embodiment, step S330 includes:

Step S331. Obtain an input layer node sequence according to the original vector matrix, perform non-linear mapping on the input layer node sequence to obtain a hidden layer node sequence corresponding to a first hidden layer, and use the first hidden layer as a current processing hidden layer.

Specifically, the input layer node sequence is a sequence formed by the original vector matrix or a sequence formed by adding a sample point to the original vector matrix. Original speech sample points are input in the input layer, and generally, 16000 sample points are input per second. The text feature sample point sequence and the original speech sample point sequence are used to form the original vector matrix, and the original vector matrix is input into the statistical parameter model. An input layer of the statistical parameter model performs non-linear mapping calculation on the original vector matrix to obtain the hidden layer node sequence corresponding to the first hidden layer, and the first hidden layer is used as the current processing hidden layer, to perform non-linear mapping on the obtained hidden layer node sequence.

Step S332. Obtain a current hidden layer node sequence corresponding to the current processing hidden layer, and perform sampling and non-linear mapping on the current hidden layer node sequence according to a current processing hidden layer sampling interval to obtain a next hidden layer node sequence, a next hidden layer sampling interval of the current processing hidden layer being a multiple of the current processing hidden layer sampling interval.

Specifically, processing is gradually performed starting from the first hidden layer, to obtain a hidden layer node sequence corresponding to each hidden layer. When the first hidden layer is used as the current processing hidden layer, the hidden layer node sequence corresponding to the first hidden layer is obtained. The hidden layer node sequence corresponding to the first hidden layer is sampled according to a first sampling interval, and first non-linear mapping is performed on sample points obtained through interval sampling to obtain a node sequence corresponding to a second hidden layer. That is, an input in the second hidden layer is an output of the first hidden layer. Then the second hidden layer is used as the current processing hidden layer, the node sequence corresponding to the second hidden layer is sampled according to a second sampling interval, and second non-linear mapping is performed on sample points obtained through interval sampling, to obtain a node sequence corresponding to a third hidden layer, and so on. A node sequence corresponding to a current hidden layer is sampled according to a particular sampling interval, and non-linear mapping is performed on sample points obtained through sampling, to obtain a sample point sequence corresponding to a next hidden layer. A non-linear mapping parameter corresponding to each hidden layer may be different, and a sampling interval can be adjusted according to training data and a total quantity of hidden layers. A sampling interval of each hidden layer is different, and the next hidden layer sampling interval of the current processing hidden layer is a multiple of the current processing hidden layer sampling interval. For example, the next hidden layer sampling interval of the current processing hidden layer is twice the current processing hidden layer sampling interval. That the next hidden layer sampling interval of the current processing hidden layer is a multiple of the current processing hidden layer sampling interval helps quick calculation.

Step S333. Use a next hidden layer of the current processing hidden layer as a current processing hidden layer, determine whether a current processing hidden layer quantity reaches a largest hidden layer quantity, and if yes, obtain a first prediction speech sample point, or if no, perform step S332.

Specifically, different hidden layers are used to process the hidden layer node sequence obtained according to the original vector matrix, to obtain a hidden layer node sequence corresponding to the next hidden layer, and the next hidden layer is used as a current processing hidden layer. Whether to end the process of using a hidden layer to perform interval sampling and non-linear mapping is determined by determining whether the current processing hidden layer is the last hidden layer. If a layer quantity corresponding to the current processing hidden layer is not the largest hidden layer quantity, the current hidden layer is further processed to obtain a hidden layer node sequence corresponding to the next hidden layer. If the layer quantity corresponding to the current processing hidden layer is the largest hidden layer quantity, interval sampling and non-linear mapping calculation are performed on a hidden layer node sequence corresponding to the largest hidden layer quantity, so that the first prediction speech sample point can be obtained.

Further, a same method may be used to predict different speech sample points of a same set of training data or to predict sample points corresponding to different training data, and then a plurality of groups of matching prediction speech sample points are compared with corresponding original speech sample points in a plurality of groups. Comparing the plurality of groups of prediction speech sample points with the corresponding original speech sample points in a plurality of groups by using a smallest difference principle further optimizes and adjusts the model parameter of the statistical parameter model.

In this embodiment, an input layer in a statistical parameter model performs non-linear mapping on an original vector matrix to obtain a node sequence corresponding to a first hidden layer, then in hidden layers of the statistical parameter model, node sequences corresponding to the layers are sampled layer by layer according to particular sampling intervals, and non-linear mapping calculation is performed on sample points after the sampling, to obtain a sequence corresponding to a next hidden layer. Prediction speech sample points corresponding to an input text feature sample point sequence are obtained by using a gradually increasing sampling interval and different non-linear mapping. Through layer-by-layer sampling and non-linear mapping, an output of a current hidden layer is used as an input of a next hidden layer of the current hidden layer, so that a value of a current prediction sample point such as an output in a moment t depends not only on a current input, that is, an input in the moment t, but also on an accumulated input in the past period of time such as inputs in moments (t−k, t−k+1, . . . , and t−1). Therefore, performing processing in a manner of increasing sampling intervals layer by layer in hidden layers can enable the statistical parameter model to remember more inputs in the past period of time. Depending on the past inputs and the current input, the model can retain more information and predict a more accurate sample point.

Figure 5:
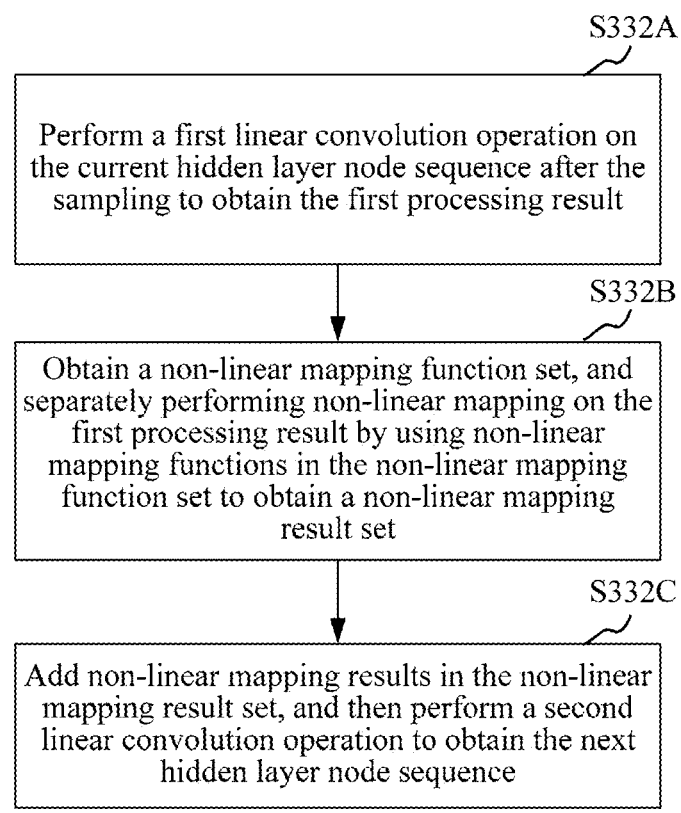
FIG. 5 is a flowchart of steps of obtaining a next hidden layer node sequence according to another embodiment.

As shown in FIG. 5, in an embodiment, the step of performing sampling and non-linear mapping on the current hidden layer node sequence according to a current processing hidden layer sampling interval to obtain a next hidden layer node sequence includes:

Step S332A. Perform a first linear convolution operation on the current hidden layer node sequence after the sampling to obtain the first processing result.

Specifically, when one hidden layer in the statistical parameter model is used as the current processing hidden layer to process data, the current processing hidden layer obtains a corresponding current hidden layer node sequence, samples the current hidden layer node sequence according to a particular sampling interval, and then performs the first linear convolution operation on a sampling result obtained through sampling, to obtain the first processing result.

Step S332B. Obtain a non-linear mapping function set, and separately perform non-linear mapping on the first processing result by using non-linear mapping functions in the non-linear mapping function set to obtain a non-linear mapping result set.

Specifically, performing a non-linear function operation on data can improve saturation and naturalness of speech synthesized by using the statistical parameter model. Therefore, after the first linear convolution operation is performed to obtain the first processing result, further, a preset non-linear mapping function set is obtained, and non-linear mapping is separately performed on the first processing result by using the non-linear mapping functions in the non-linear mapping function set, to obtain the non-linear mapping result set. A quantity of non-linear mapping functions in the non-linear mapping function set and a specific operation formula may be customized as needed.

Step S332C. Add non-linear mapping results in the non-linear mapping result set, and then perform a second linear convolution operation to obtain the next hidden layer node sequence.

Specifically, to further increase a success rate of the statistical parameter model in fitting complex data, the non-linear mapping result set is obtained, and the non-linear mapping results in the non-linear mapping result set are added, and then the second linear convolution operation is performed on the added results for outputting, as the next hidden layer node sequence. The first linear convolution operation and the second linear convolution operation are linear convolution operations with different parameters.

In this embodiment, a first linear convolution operation is performed on a hidden layer node sequence to obtain a first processing result, then different non-linear mapping is performed on the first processing result, non-linear mapping result vectors are added, and then a second linear convolution operation is performed, to obtain a next hidden layer node sequence. A summation is performed by using the two different linear convolution operations and a plurality of non-linear mapping, thereby improving a fitting capability of complex data of a statistical parameter model.

In an embodiment, the step of obtaining a non-linear mapping function set, and separately performing non-linear mapping on the first processing result by using non-linear mapping functions in the non-linear mapping function set to obtain a non-linear mapping result set includes:

obtaining the non-linear mapping function set, and separately performing non-linear mapping on the first processing result by using a tan h function and a sigmoid function in the non-linear mapping function set to obtain the non-linear mapping result set.

Specifically, the non-linear mapping function set includes a plurality of different non-linear mapping functions, for performing different non-linear mapping on data. Herein, the tan h function and the sigmoid function in the non-linear mapping function set are used to process the first processing result to obtain the non-linear mapping result set. The tan h function is a hyperbolic tangent function, a function image is a strictly monotonically increasing curve crossing the origin and crossing the I and III quadrants, and the image is limited between two horizontal asymptotes y=1 and y=−1. The sigmoid function is an S-type function. Due to its natures such as being monotonically increasing and having an inverse function that is monotonically increasing, the sigmoid function is often used as a threshold function of a neural network, to map a variable to 0-1.

In an embodiment, the step of obtaining an input layer node sequence according to the original vector matrix, performing non-linear mapping on the input layer node sequence to obtain a hidden layer node sequence corresponding to a first hidden layer, and using the first hidden layer as a current processing hidden layer includes:

obtaining a supplementary text feature sample point and a corresponding supplementary speech sample point, matching and adding the supplementary text feature sample point and the corresponding supplementary speech sample point to the original vector matrix to obtain a supplementary vector matrix, obtaining the input layer node sequence according to the supplementary vector matrix, performing non-linear mapping on the input layer node sequence to obtain the hidden layer node sequence corresponding to the first hidden layer, and using the first hidden layer as the current processing hidden layer; and performing the step of obtaining a current hidden layer node sequence corresponding to the current processing hidden layer, to obtain a second prediction speech sample point; and the step of determining a model parameter of the statistical parameter model according to the prediction speech sample point and a corresponding original speech sample point by using a smallest difference principle, to obtain a corresponding target statistical parameter model includes:

determining the model parameter of the statistical parameter model according to the first prediction speech sample point, a corresponding first original speech sample point, the second prediction speech sample point, and a corresponding second original speech sample point by using the smallest difference principle, to obtain the corresponding target statistical parameter model.

Specifically, a segment of speech usually starts from silence, and a text feature sample point and a speech sample point corresponding to the silence may be used as a supplementary text feature sample point. The supplementary text feature sample point is matched with a corresponding supplementary speech sample point, and then the supplementary text feature sample point and the corresponding supplementary speech sample point are added to the original vector matrix to obtain the supplementary vector matrix. The input layer node sequence is obtained according to the supplementary vector matrix, and non-linear mapping is performed on the input layer node sequence to obtain the hidden layer node sequence corresponding to the first hidden layer. The first hidden layer is used as the current processing hidden layer, and the supplementary vector matrix is processed in a manner in which the original vector matrix is processed, to obtain the second prediction speech sample point corresponding to the supplementary vector matrix.

Further, the first prediction speech sample point obtained according to the original vector matrix is compared with the corresponding first original speech sample point, the second prediction speech sample point obtained according to the supplementary vector matrix is compared with the corresponding second original speech sample point, a parameter that make both differences between the two prediction speech sample points and corresponding original speech sample points respectively the smallest is determined, and the parameter is used as the model parameter of the statistical parameter model, to obtain the corresponding target statistical parameter model.

In this embodiment, the supplementary text feature sample point is matched with the corresponding supplementary speech sample point to generate the supplementary vector matrix, to train the statistical parameter model to obtain the second prediction sample point. Two prediction sample points are compared with corresponding original speech sample points respectively, thereby improving accuracy of the model parameter of the statistical parameter model. Further, in this manner, a supplementary text feature sample point and a corresponding supplementary speech sample point may be added again to obtain a plurality of prediction speech sample points, to improve accuracy of the model parameter, thereby improving naturalness of synthesized speech.

Figure 6:
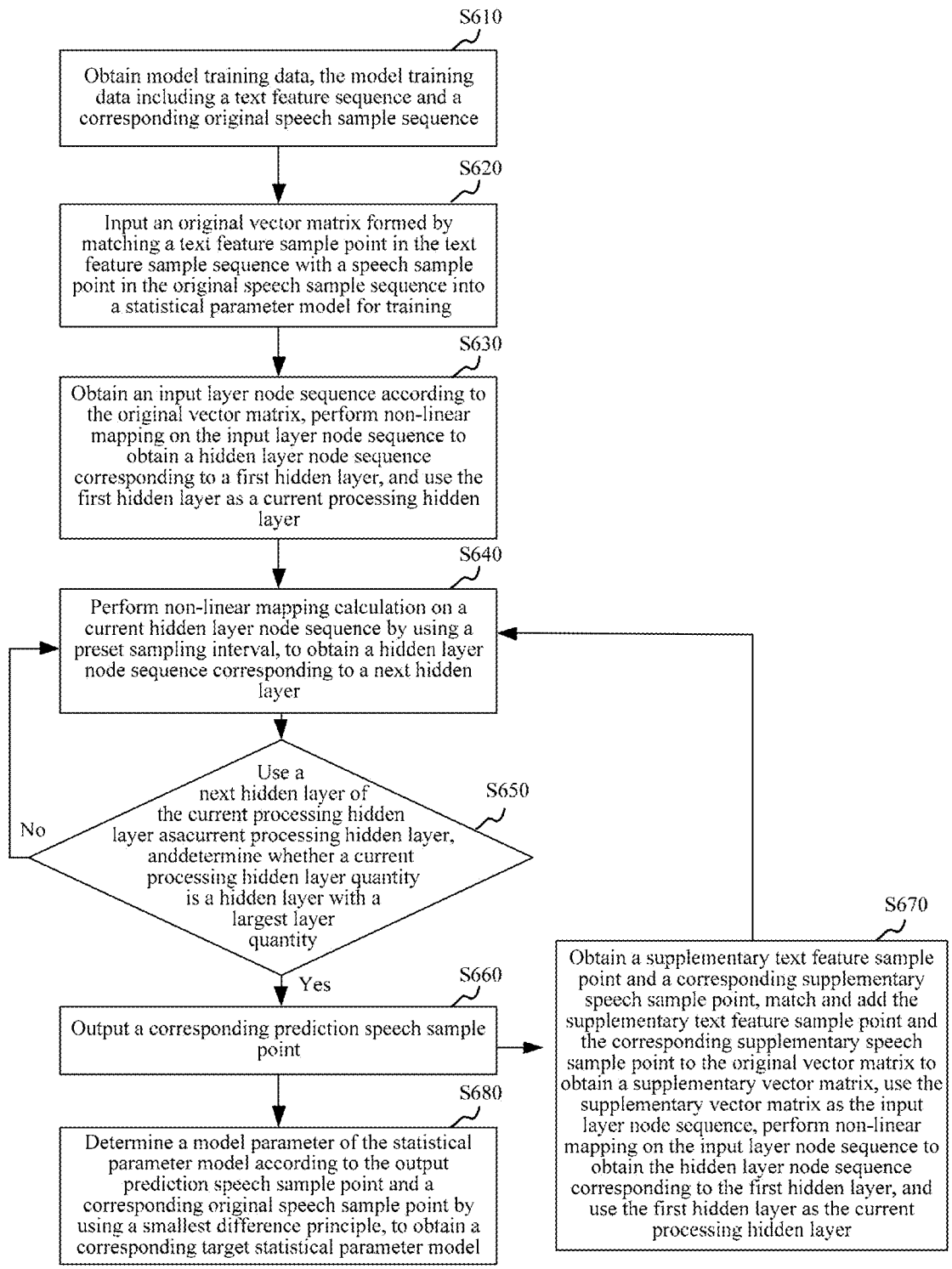
FIG. 6 is a flowchart of a statistical parameter modeling method according to another embodiment.

As shown in FIG. 6, in a specific embodiment, a statistical parameter modeling method is provided and includes the following content:

Step S610. Obtain model training data, the model training data including a text feature sequence and a corresponding original speech sample sequence.

Step S620. Input an original vector matrix formed by matching a text feature sample point in the text feature sample sequence with a speech sample point in the original speech sample sequence into a statistical parameter model for training.

Step S630. Obtain an input layer node sequence according to the original vector matrix, perform non-linear mapping on the input layer node sequence to obtain a hidden layer node sequence corresponding to a first hidden layer, and use the first hidden layer as a current processing hidden layer.

Step S640. Non-linear mapping calculation is performed on a current hidden layer node sequence by using a preset sampling interval, to obtain a hidden layer node sequence corresponding to a next hidden layer.

Figure 7:
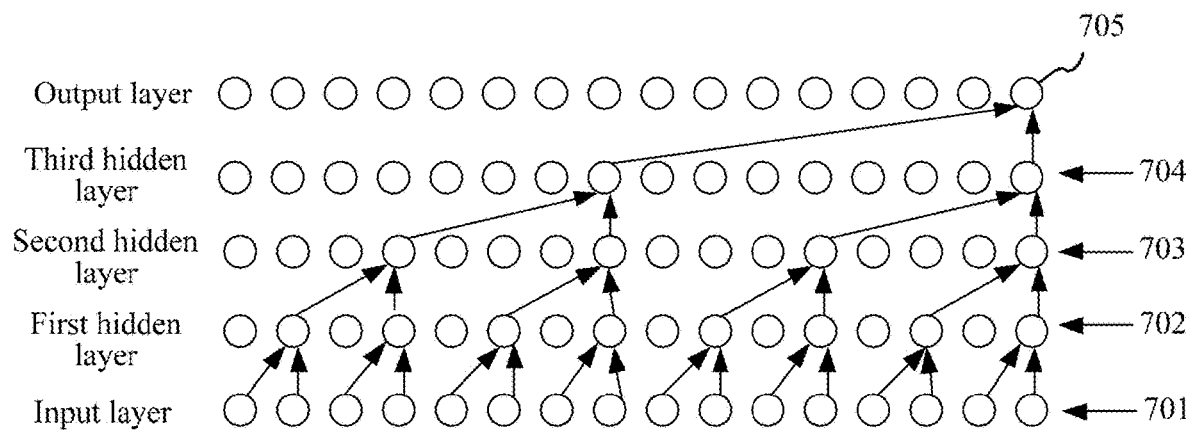
FIG. 7 is a schematic principle diagram of a method for obtaining a prediction sample point according to an embodiment.

Specifically, a non-linear mapping operation is performed on a sample point in an input layer or a hidden layer by using a different sampling interval, to obtain a corresponding sample point. A sampling interval of a next hidden layer of a current hidden layer is a multiple of a sampling interval of the current hidden layer. As shown in FIG. 7, an input layer node sequence 701 is sampled, and non-linear mapping is performed on all nodes in the input layer node sequence 710, to obtain a hidden layer node sequence 702 corresponding to the first hidden layer. A sample point in the hidden layer node sequence 702 corresponding to the first hidden layer is sampled, a sampling interval is twice a sampling interval of the input layer node sequence, one hidden layer node is selected every two points, and non-linear mapping is performed on the selected hidden layer node to obtain a corresponding sample point, thereby obtaining a hidden layer node sequence 703 corresponding to a second hidden layer. The rest can be deduced by analogy. As a quantity of hidden layers increases, sampling intervals of hidden layer node sequence corresponding to the hidden layers are sequentially increased exponentially, until the quantity of hidden layers is a largest hidden layer quantity. A hidden layer node sequence in the largest hidden layer quantity of hidden layers is sampled according to the foregoing rule, to obtain a corresponding sample point. The sample point is an input prediction speech sample point corresponding to a speech sample point sequence. As shown in FIG. 7, a hidden layer node sequence 704 corresponding to a third hidden layer is sampled to obtain a prediction speech sample point 705.

Further, it should be noted that in a process of training the statistical parameter model to obtain a prediction speech sample point, non-linear mapping is performed on both an input text feature sequence and an input original speech sample sequence by using the statistical parameter model, the non-linear mapping performed on the text feature sequence and the non-linear mapping performed on the original speech sample sequence correspond to different parameters. The text feature sequence is used for instructing the statistical parameter model to generate the prediction speech sample point. Changing a parameter of the statistical parameter model corresponding to the text feature sequence or changing a parameter in the statistical parameter model corresponding to the original speech sample sequence affects a result of the prediction speech sample point.

Figure 8:
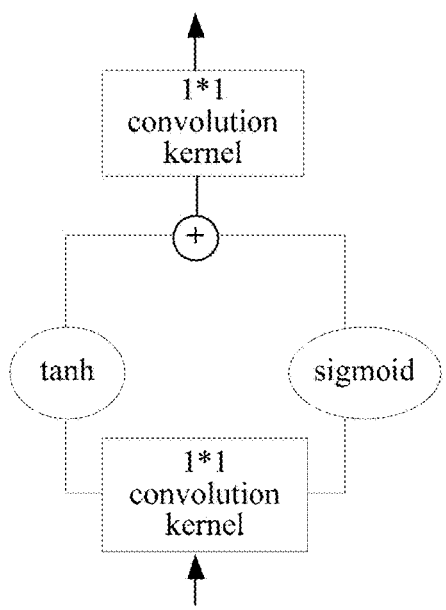
FIG. 8 is a schematic principle diagram of non-linear mapping in a statistical parameter modeling method according to an embodiment.

Further, non-linear mapping is performed on the original vector matrix formed by matching the text feature sample point in the text feature sample sequence with the speech sample point in the original speech sample sequence. As shown in FIG. 8, a process of performing non-linear mapping on the text feature sample point and the speech sample point in the statistical parameter model is provided. For different hidden layers, a preset quantity of sample points are obtained for a 1*1 convolution kernel operation, to obtain a first processing result, then non-linear mapping is performed on the first processing result separately by using a tan h function and a sigmoid function, non-linear mapping results are added, and a 1*1 convolution kernel operation is performed on an adding result, to obtain a hidden layer node in a hidden layer node sequence corresponding to a next layer. A plurality of hidden layer nodes forms a hidden layer node sequence. The two 1*1 convolution kernel operations correspond to different parameter, that is, the two 1*1 convolution kernel operations are different convolution kernel operations.

Step S650. Use the next hidden layer of the current processing hidden layer as a current processing hidden layer, determine whether the current processing hidden layer is a hidden layer with a largest layer quantity, and if yes, perform step S660, or if no, perform step S640.

Specifically, the statistical parameter model includes a plurality of hidden layers. When the original vector matrix is input and an original speech sample point sequence and the text feature sequence are used to obtain the prediction speech sample point, operations are performed in a plurality of hidden layers. To determine whether the prediction speech sample point is to be output, a quantity of hidden layers is determined. If a quantity of current hidden layers is the largest hidden layer quantity, it indicates that sampling a hidden layer node sequence corresponding to a current hidden layer can obtain a corresponding prediction speech sample point. If the quantity of current hidden layers is not the largest hidden layer quantity, an obtained sample point is located in a node corresponding to the next hidden layer. Therefore, when a node sequence corresponding to the current hidden layer is obtained, it is first determined whether the current hidden layer is a hidden layer with a largest layer quantity, and if yes, perform step S660, or if no, perform step S640.

Step S660. Output a corresponding prediction speech sample point.

Specifically, when it is determined that a layer quantity of the current processing hidden layer is the largest hidden layer quantity, interval sampling and non-linear mapping are performed on a hidden layer node sequence corresponding to the hidden layer with the largest hidden layer quantity, to obtain a prediction speech sample point corresponding to an input vector matrix, and output the corresponding prediction speech sample point.

Step S670. Obtain a supplementary text feature sample point and a corresponding supplementary speech sample point, match and add the supplementary text feature sample point and the corresponding supplementary speech sample point to an original vector matrix to obtain a supplementary vector matrix, use the supplementary vector matrix as the input layer node sequence, perform non-linear mapping on the input layer node sequence to obtain the hidden layer node sequence corresponding to the first hidden layer, use the first hidden layer as a current processing hidden layer, and perform step S640.

Specifically, a schematic diagram shown in FIG. 7 includes predicted speech sample points corresponding to an input original speech vector matrix. To construct the statistical parameter model, the prediction speech sample point needs to be compared with the corresponding original speech sample point. Therefore, obtaining only one corresponding speech sample point may cause the model parameter of the corresponding statistical parameter model to be inaccurate. It can be seen from FIG. 7 that, if a previous prediction sample point of a current prediction sample point is to be obtained, an input node needs to be added to the input layer node sequence. A piece of speech usually includes a silent part. Therefore, the supplementary text feature sample point and the corresponding supplementary speech sample point are added before the input layer node sequence 701, to generate a new input layer node sequence 701. The supplementary text feature sample point can be continuously added to an original vector matrix according to an actual requirement, to generate a new supplementary vector matrix, and then the supplementary vector matrix is processed starting from step S640, to obtain more prediction speech sample points to be compared with the original speech sample point, thereby improving accuracy of the model parameter.

Step S680. Determine a model parameter of the statistical parameter model according to the output prediction speech sample point and a corresponding original speech sample point by using a smallest difference principle, to obtain a corresponding target statistical parameter model.

Specifically, obtained one or more prediction speech sample points are separately compared with the corresponding original speech sample point, and the model parameter of the statistical parameter model is continuously adjusted, to determine a model parameter that can make differences respectively between the one or more prediction speech sample points and the corresponding original speech sample point the smallest, to obtain a corresponding target statistical model.

Figure 9:
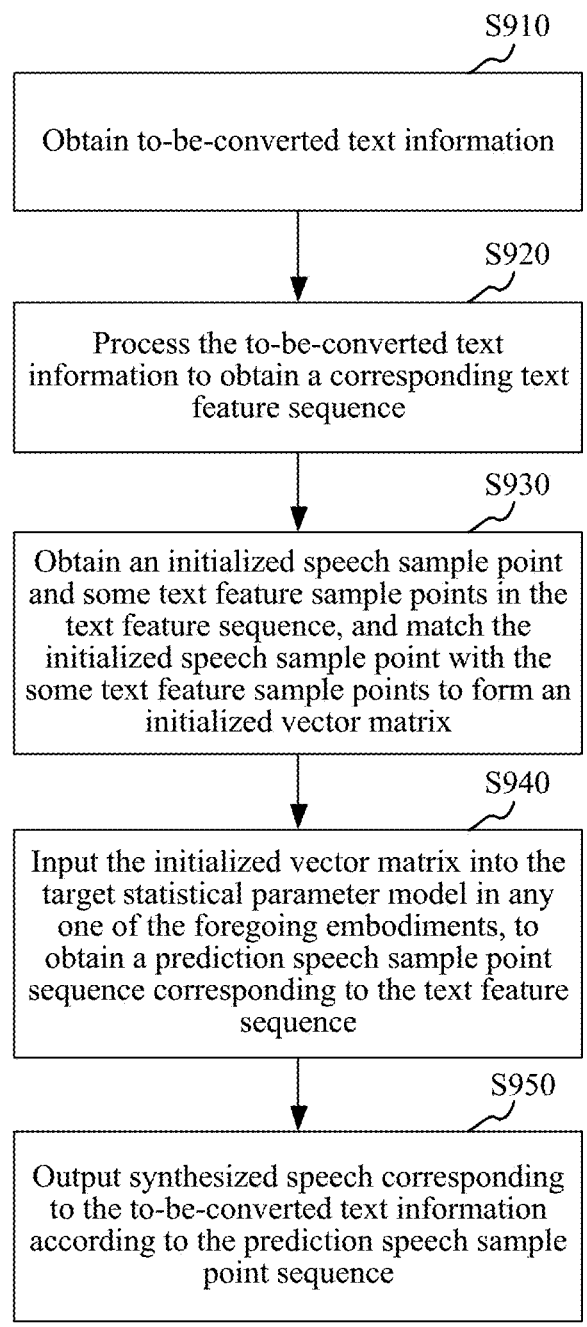
FIG. 9 is a flowchart of a speech synthesis method according to an embodiment.

As shown in FIG. 9, in an embodiment, a speech synthesis method is provided and includes the following content:

Step S910. Obtain to-be-converted text information.

Specifically, the to-be-converted text information is text information to be converted into speech, and the obtained to-be-converted text information may be text information input by a terminal, where the text information is sent, by using an installed TTS function application, to a server for conversion, or may be text information sent by a hardware device that can implement TTS conversion.

Step S920. Process the to-be-converted text information to obtain a corresponding text feature sequence.

Specifically, after obtaining the to-be-converted text information, a front end module in a TTS system analyzes and processes the to-be-converted text information, converts the originally input to-be-converted text information into different intermediate-state information, for instructing sounding of text, and generates a corresponding text feature sequence by using the intermediate-state information.

Step S930. Obtain an initialized speech sample point and some text feature sample points in the text feature sequence, and match the initialized speech sample point with the text feature sample points to form an initialized vector matrix.

Specifically, the obtained text feature sequence is sampled to obtain a text feature sample point sequence. In a process of training a statistical parameter model, a text feature sample point and a speech sample point need to be used to correspondingly generate a vector pair to obtain a prediction speech sample point. Therefore, to obtain a prediction speech sample point, some sample points in the text feature sample point sequence need to be obtained, and an initialized speech sample point corresponding to the some sample points is to be obtained. The initialized speech sample point is usually considered as a value of a speech sample point corresponding to silence. The obtained some text feature sample points and the initialized speech sample point are used to form the initialized vector matrix.

Step S940. Input the initialized vector matrix into the target statistical parameter model in any one of the foregoing embodiments, to obtain a prediction speech sample point sequence corresponding to the text feature sequence.

Specifically, the generated initialized vector matrix is input into the target statistical parameter model in any embodiment. The target statistical parameter model is used to calculate the initialized vector matrix, to obtain a prediction speech sample point corresponding to the text feature sequence. A supplementary text feature sample point and a corresponding speech sample point are continuously added to the initialized vector matrix, to continuously obtain prediction speech sample points. Finally, the obtained prediction speech sample points are combined to generate the corresponding prediction speech sample point sequence.

Step S950. Output synthesized speech corresponding to the to-be-converted text information according to the prediction speech sample point sequence.

Specifically, after the prediction speech sample point sequence formed by the prediction speech sample points is obtained, which is equivalent to obtaining a plurality of sample points of output speech, a waveform of the corresponding output speech can be obtained through image data processing, thereby outputting the synthesized speech corresponding to the to-be-converted text information.

Figure 10:
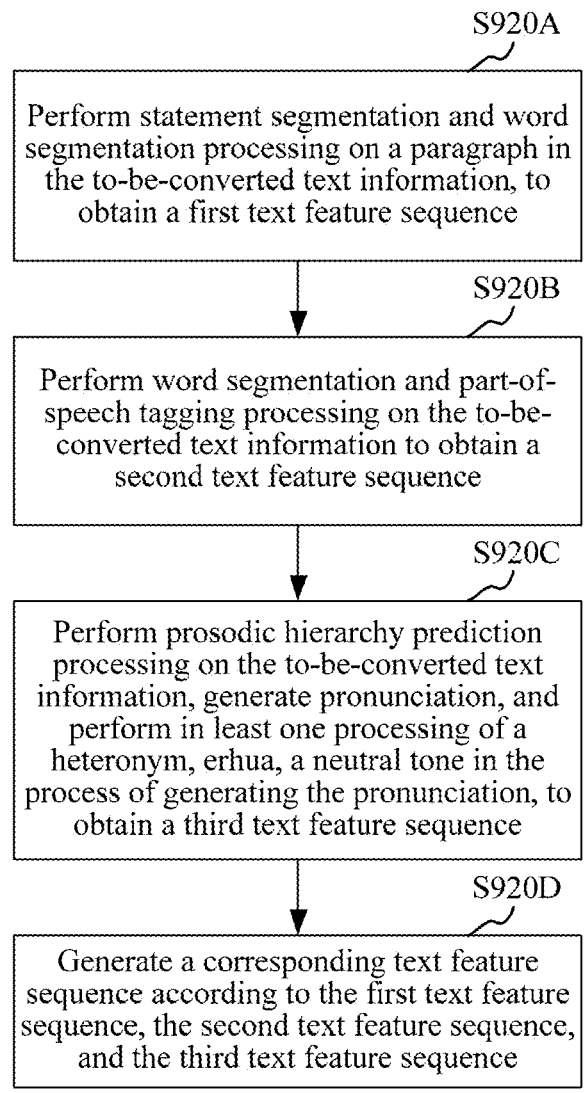
FIG. 10 is a flowchart of steps of obtaining a text feature sequence according to an embodiment.

As shown in FIG. 10, in an embodiment, step S920 includes:

Step S920A. Perform statement segmentation and word segmentation processing on a paragraph in the to-be-converted text information, to obtain a first text feature sequence.

Specifically, after obtaining the to-be-converted text information, the TTS system first normalizes text, that is, converts non-Chinese characters into standard Chinese characters. Then the TTS system performs different processing on the normalized to-be-converted text information to obtain corresponding text feature sequences. For example, to make it easier to read content in the text information, the TTS system first performs statement segmentation on a paragraph in the to-be-converted text information, that is, divides the paragraph into corresponding statements, then performs word segmentation on the statements, combines corresponding words together, and determines different pause intervals existing between word segments according to a context relationship for tagging, to obtain the first text feature sequence.

Step S920B. Perform word segmentation and part-of-speech tagging processing on the to-be-converted text information to obtain a second text feature sequence.

Specifically, after word segmentation processing is performed on the obtained to-be-converted text information, part-of-speech tagging processing is performed on a single phase or a single word obtained after the word segmentation, for example, a corresponding word segment is tagged as one of a noun, a verb, or an adjective, to obtain the second text feature sequence.

Step S920C. Perform prosodic hierarchy prediction processing on the to-be-converted text information, generating pronunciation, and performing in least one processing of a heteronym, erhua, a neutral tone in the process of generating the pronunciation, to obtain a third text feature sequence.

Specifically, prosodic hierarchy prediction is performed on the to-be-converted text information, to further group a word segment as a prosodic word, a prosodic phrase, or an intonational phrase. The prosodic word is a word integrating all information such as pronunciation, part of speech, and pause. The prosodic phrase is a phrase formed by prosodic words. The intonational phrase is a phrase indicating whether a phrase should be pronounced in an intonation of a declarative sentence, an interrogative sentence, an exclamatory sentence, or the like after context analysis. Corresponding pronunciation is generated according to the prosodic hierarchy prediction, and in least one type of processing of pronunciation phenomena such as a heteronym, erhua, and a neutral tone in pronunciation is performed, to obtain the third text sequence.

Step S920D. Generate a corresponding text feature sequence according to the first text feature sequence, the second text feature sequence, and the third text feature sequence.

Specifically, the to-be-converted text information is processed in different manners to obtain the corresponding first text feature sequence, the corresponding second text feature sequence, and the corresponding third text feature sequence. The first text feature sequence, the second text feature sequence, and the third text feature sequence all belong to intermediate-state information of the to-be-converted text information, are used for instructing the statistical parameter model to read text as speech, and all need to participate in calculation. Therefore, the first text feature sequence, the second text feature sequence, and the third text feature sequence are used to generate the corresponding text feature sequence, to participate in an operation of the statistical parameter model.

Figure 11:
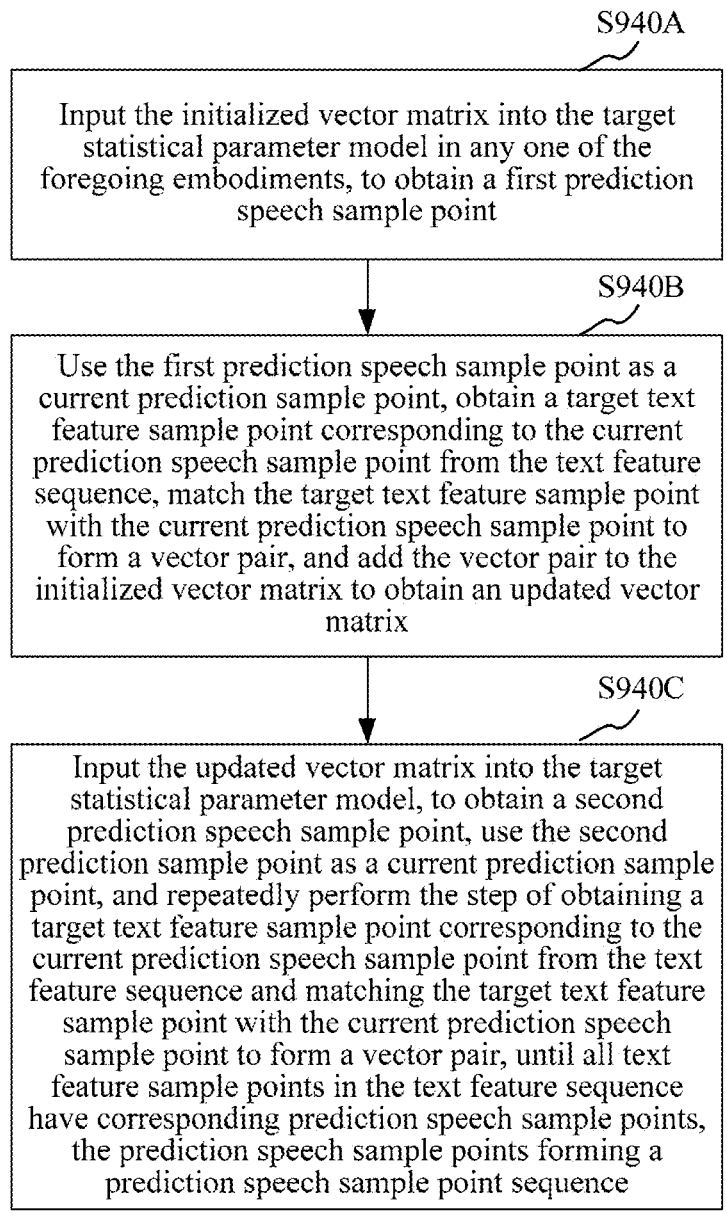
FIG. 11 is a flowchart of steps of obtaining a prediction speech sample point sequence according to an embodiment.

As shown in FIG. 11, in an embodiment, step S940 includes:

Step S940A. Input the initialized vector matrix into the target statistical parameter model in any one of the foregoing embodiments, to obtain a first prediction speech sample point.

Specifically, the initialized vector matrix is input into the target statistical parameter model in any one of the foregoing embodiments, and the first prediction speech sample point corresponding to the initialized vector matrix can be obtained according to the initialized vector matrix and a model feature of the target statistical parameter model.

Step S940B. Use the first prediction speech sample point as a current prediction sample point, obtain a target text feature sample point corresponding to the current prediction speech sample point from the text feature sequence, match the target text feature sample point with the current prediction speech sample point to form a vector pair, and add the vector pair to the initialized vector matrix to obtain an updated vector matrix.

Specifically, to perform speech conversion on subsequent text information, a text feature sequence and a corresponding speech sample point sequence need to be supplemented. The first prediction speech sample point obtained according to the initialized vector matrix corresponds to one text feature sample point in the text feature sample point sequence. The first prediction sample point is matched with the corresponding text feature sample point to form a vector pair, and the vector pair is added to the initialized vector matrix to obtain the updated vector matrix.

Step S940C. Input the updated vector matrix into the target statistical parameter model, to obtain a second prediction speech sample point, use the second prediction sample point as a current prediction sample point, and repeatedly perform the step of obtaining a target text feature sample point corresponding to the current prediction speech sample point from the text feature sequence and matching the target text feature sample point with the current prediction speech sample point to form a vector pair, until all text feature sample points in the text feature sequence have corresponding prediction speech sample points, the prediction speech sample points forming a prediction speech sample point sequence.

Specifically, the updated vector matrix formed according to the first prediction speech sample point is input into the target statistical parameter model for processing and calculation, to obtain the second prediction speech sample point. Then a text feature sample point corresponding to the second prediction speech sample point in a supplementary text feature sample point sequence is obtained to form a vector pair. The vector pair is added to the updated vector matrix corresponding to the first prediction speech sample point, to form a new updated vector matrix. The new updated vector matrix is input into the target statistical parameter model to obtain a third prediction speech sample point. The rest can be deduced by analogy. The foregoing addition process is repeated, until almost all text feature sample points in the text feature sample point sequence corresponding to prediction speech sample points. The prediction speech sample points are used to form the prediction speech sample point sequence, to obtain corresponding synthesized speech.

In this embodiment, a prediction speech sample point is added to an initialized speech sample point, a text feature sample point sequence is supplemented and matched with prediction speech text to form a vector pair through combination, the vector pair is added to an original vector matrix, to obtain a corresponding prediction speech sample point, and the foregoing process is repeated, so that a prediction speech sample point sequence corresponding to a text feature sample point sequence corresponding to to-be-converted text information can be obtained, thereby obtaining synthesized speech, implementing conversion from a sample point to a sample point, and improving output saturation and naturalness of the synthesized speech.

Figure 12:
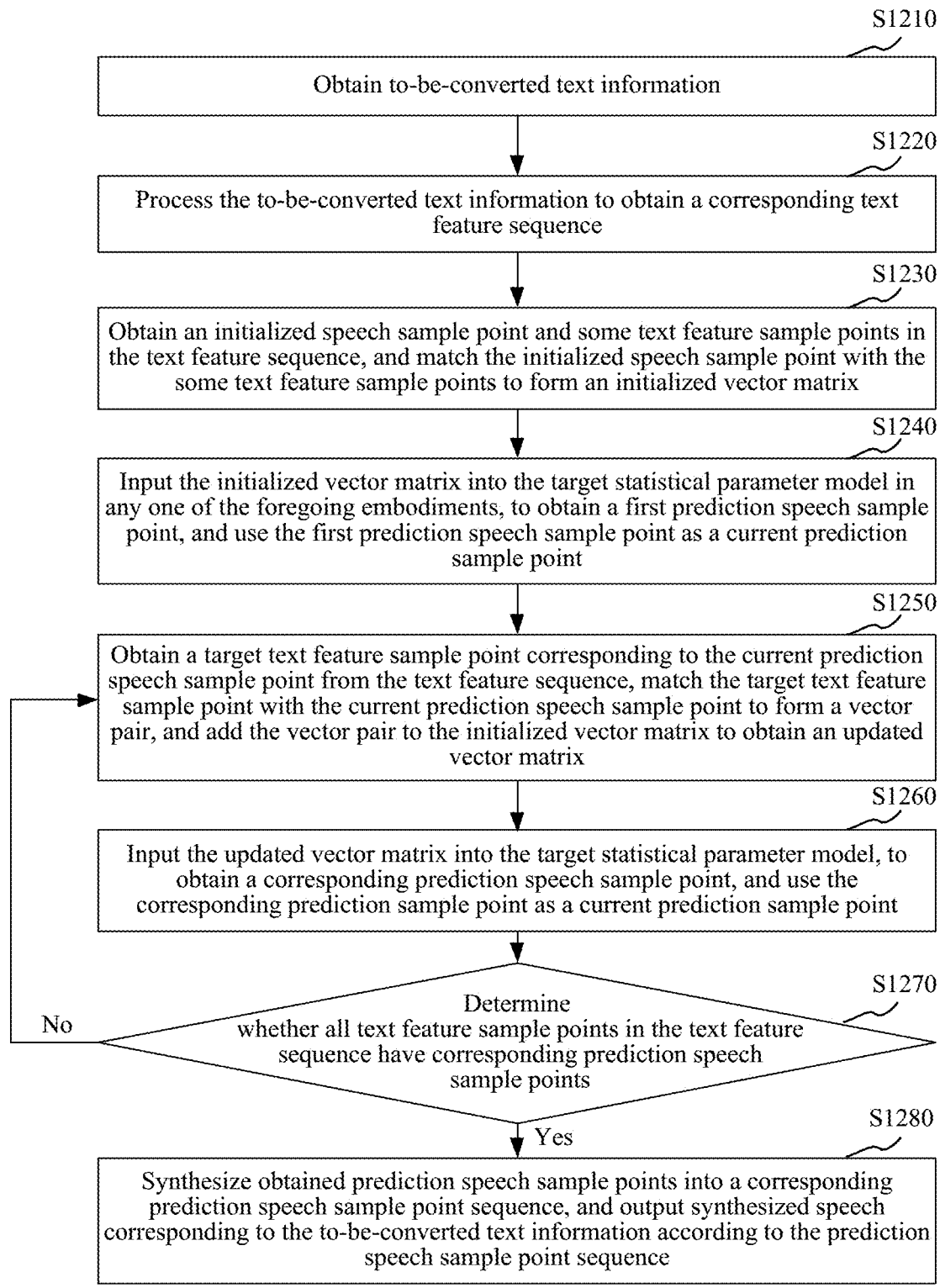
FIG. 12 is a flowchart of a speech synthesis method according to another embodiment.

As shown in FIG. 12, in a specific embodiment, a flowchart of a speech synthesis method is provided, including the following content:

Step S1210. Obtain to-be-converted text information.

Step S1220. Process the to-be-converted text information to obtain a corresponding text feature sequence.

Figure 13:
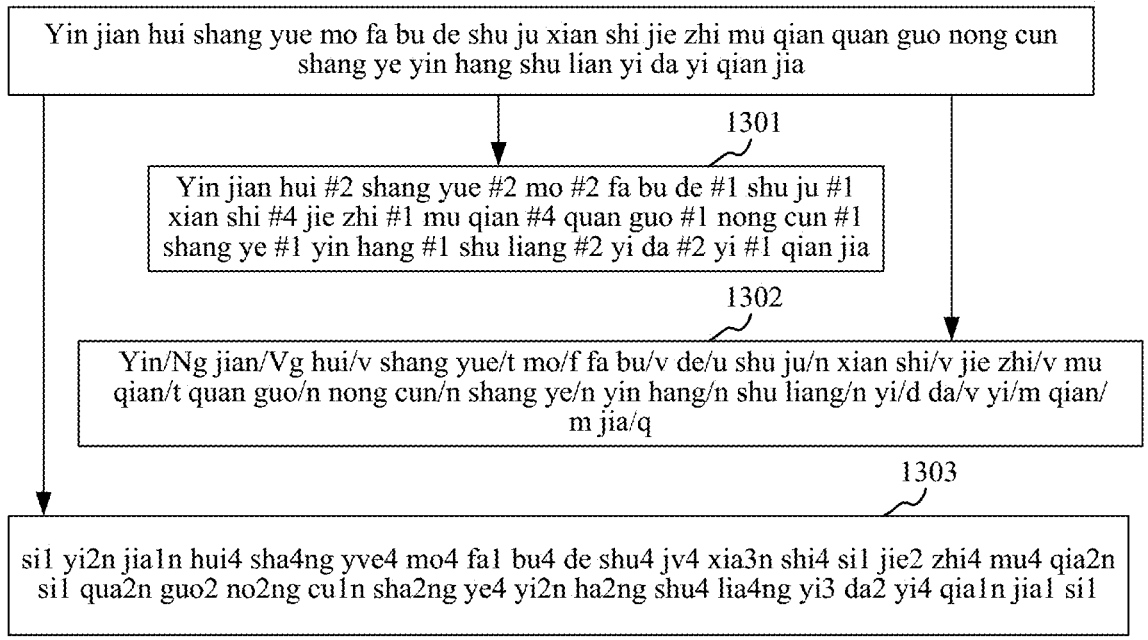
FIG. 13 is a schematic diagram of steps of obtaining a text feature sequence according to an embodiment.

Specifically, as shown in FIG. 13, the to-be-converted text information is obtained, and the to-be-converted text information is processed, to obtain, for example, first intermediate-state information 1301, second intermediate-state information 1302, and third intermediate-state information 1303. The obtain intermediate-state information is encoded to obtain the corresponding text feature sequence. In intermediate-state information corresponding to the first intermediate-state information 1301, #2 corresponds to a prosodic pause, indicating how long the pause between words should be, #1 corresponds to a shortest pause, and the human ear usually cannot feel the pause, but the pause is important for synthesizing natural speech. #4 corresponds to a long pause, and the pause can be distinguished by the human ear. In a state of the second intermediate-state information 1302, n represents a noun, v represents a verb, and different tagging represent different parts of speech. The third intermediate-state information 1303 is pinyin corresponding to the text information, and intonations corresponding to the pinyin.

Step S1230. Obtain an initialized speech sample point and some text feature sample points in the text feature sequence, and match the initialized speech sample point with the text feature sample points to form an initialized vector matrix.

Step S1240. Input the initialized vector matrix into the target statistical parameter model in any one of the foregoing embodiments, to obtain a first prediction speech sample point, and use the first prediction speech sample point as a current prediction sample point.

Specifically, the initialized vector matrix is input into the target statistical parameter model in any one of the foregoing embodiments. Statistical parameter model calculation is performed on the text feature sequence in the initialized vector matrix, and the statistical parameter model is instructed to sound the corresponding text information. In addition, statistical parameter model calculation is performed on an initialized speech sample point sequence. The foregoing two steps are both performed to obtain the first prediction sample point. As shown in A in FIG. 15, a process of performing non-linear mapping on the target statistical parameter model after the initialized vector matrix is input into the target statistical parameter model is provided. After the target statistical parameter model is used, a first prediction speech sample point 1501 is obtained, and the first prediction speech sample point is used as a current prediction speech sample point.

Step S1250. Obtain a target text feature sample point corresponding to a current prediction speech sample point from the text feature sequence, match the target text feature sample point with the current prediction speech sample point to form a vector pair, and add the vector pair to the initialized vector matrix to obtain an updated vector matrix.

Figure 15:
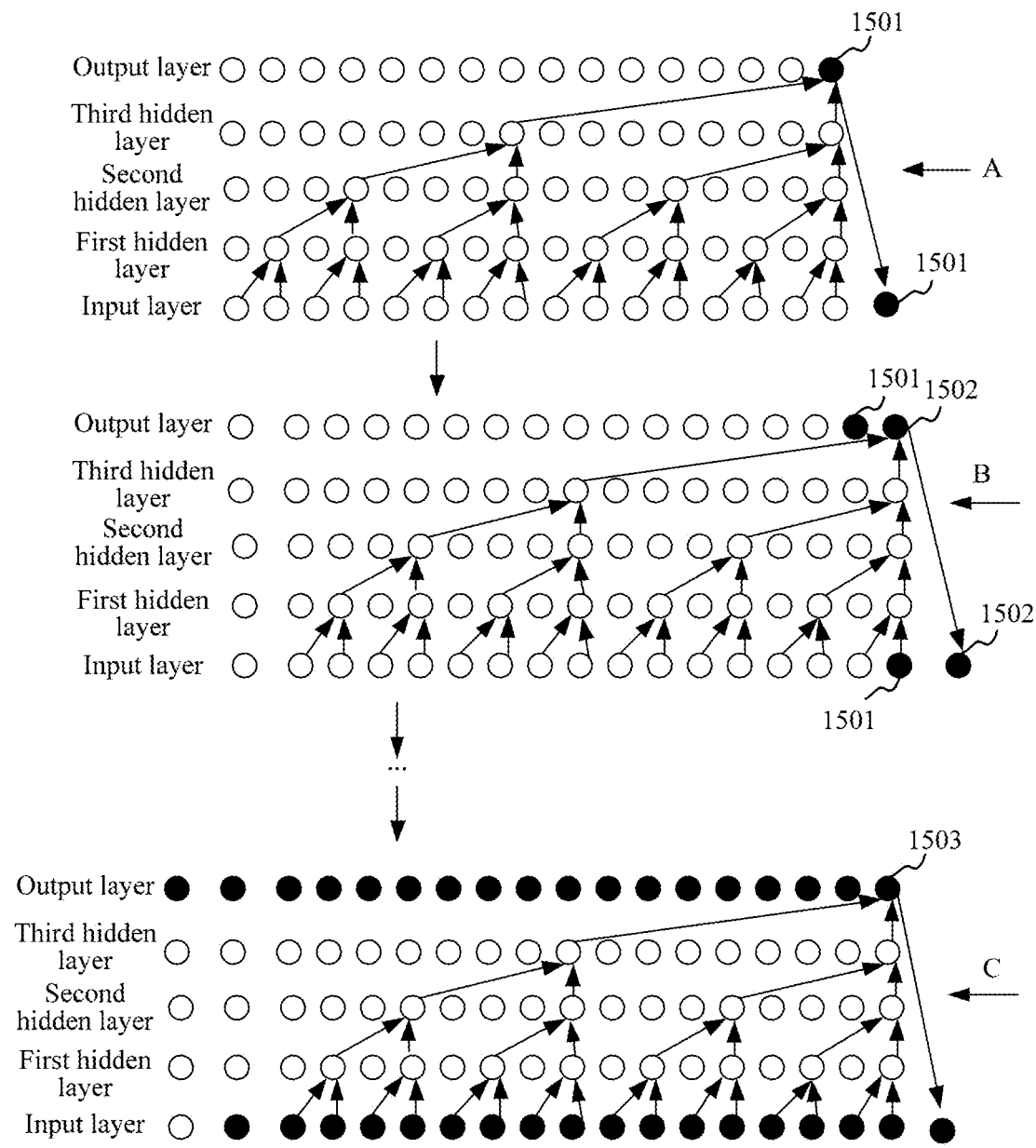
FIG. 15 is a schematic principle diagram of steps of obtaining a prediction speech sample point sequence according to an embodiment.

Specifically, the obtained current prediction speech sample point is matched with a corresponding text feature sample point in a to-be-converted text feature sequence to form a vector pair, and the vector pair is added to the initialized vector matrix to obtain an updated vector matrix. As shown in FIG. 15, after the first prediction speech sample point 1501 is obtained, the first prediction speech sample point 1501 is added to an input layer sample sequence, to form a new input layer sample sequence. In addition, a text feature sample point corresponding to the first prediction speech sample point 1501 is input into the target statistical parameter model to participate in calculation, to instruct the target statistical parameter model to generate corresponding speech.

Step S1260. Input the updated vector matrix into the target statistical parameter model, to obtain a corresponding prediction speech sample point, and use the corresponding prediction sample point as a current prediction sample point.

Specifically, the updated vector matrix is input into the target statistical parameter model, the target statistical parameter model calculates, as shown by B in FIG. 15, the updated vector matrix to obtain a corresponding prediction speech sample point 1502, and the corresponding prediction speech sample point is used as a current speech sample point.

Step S1270. Determine whether all text feature sample points in the text feature sequence have corresponding prediction speech sample points, and if yes, perform step S1280, or if no, perform step S1250.

Specifically, according to the process shown by A in FIG. 15 to B in FIG. 15, the obtained prediction speech sample point is added to an input layer node sequence, and is then input into the target statistical parameter model for calculation, to obtain a corresponding prediction speech sample point. To obtain corresponding synthesized speech, a prediction speech sample point corresponding to the input text feature sample point is obtained. Therefore, after the corresponding prediction speech sample point is obtained and a text feature sample point in a to-be-converted text sequence is matched according to the prediction speech sample point, it is determined whether all the text feature sample points in the text feature sequence have corresponding prediction speech sample points, and if yes, it indicates that all input text feature sequences are converted into corresponding prediction speech sample points. As shown by C in FIG. 15, after a prediction speech sample point 1503 is obtained and added to an input layer sample sequence, the input layer sample sequence enters the target statistical parameter model again, and sample points participating in calculation all change into prediction speech sample points. In this case, step S1280 is performed. If all the text feature sample points in the text feature sequence do not have corresponding prediction speech sample points, as a state shown by C in FIG. 15, return to step S1250.

Step S1280. Synthesize obtained prediction speech sample points into a corresponding prediction speech sample point sequence, and output synthesized speech corresponding to the to-be-converted text information according to the prediction speech sample point sequence.

Specifically, after the prediction speech sample point sequence corresponding to the to-be-converted text information is obtained, a speech waveform corresponding to the prediction speech sample point is obtained according to image processing, and the corresponding synthesized speech is output.

Figure 14:
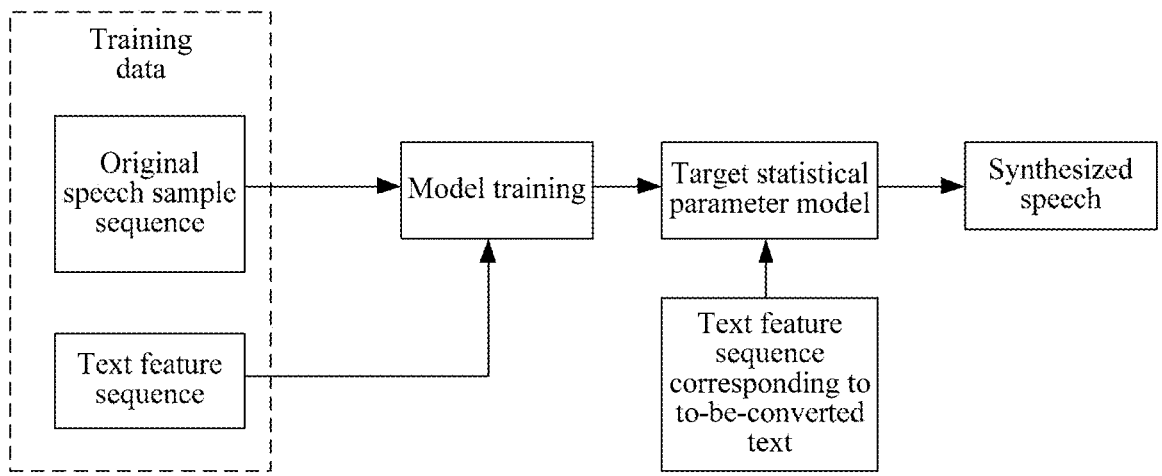
FIG. 14 is a brief principle diagram of obtaining synthesized speech according to a statistical parameter model according to an embodiment.

As shown in FIG. 14, a process of constructing the statistical parameter model and obtaining the corresponding synthesized speech according to the target statistical parameter model by using input text information is provided. First, the statistical parameter model is trained by using training data including text information and corresponding speech information, to obtain the target statistical parameter model in any one of the foregoing embodiments. After the target statistical parameter model is constructed, the to-be-converted text information is input. A processing process shown in FIG. 13 is first performed on the to-be-converted text information, to obtain corresponding text intermediate-state information. The intermediate-state information is encoded to obtain a text feature sequence. The target statistical parameter model obtains a text feature sequence through text analysis, and obtains synthesized speech according to the obtained text feature sequence with reference to a parameter of the target statistical parameter model. In an actual test, a result of training a TTS system based on the statistical parameter model for approximately 10 hours by using a text feature sequence and a corresponding male speech sample sequence as training data is obtained and is compared with quality of synthesized speech of a conventional vocoder-based TTS system of a hidden Markov model+a decision tree and quantity of synthesized speech of a TTS system based on a depth model. Synthesized speech output based on the solution of the statistical parameter model is closer to human voice, and its quantity is better than sound quantity of a TTS system based on a mosaic synthesis model.

Figure 16:
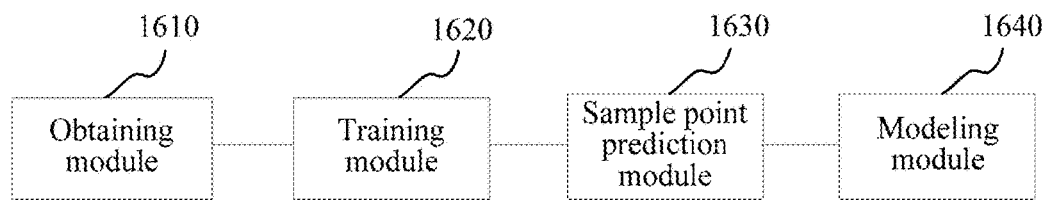
FIG. 16 is a structural block diagram of a server according to an embodiment.

As shown in FIG. 16, in an embodiment, a server is provided. An internal structure of the server may correspond to the structure shown in FIG. 2. All or some of the following modules may be implemented by using software, hardware, or a combination thereof. The server includes an obtaining module 1610, a training module 1620, a sample point prediction module 1630, and a modeling module 1640.

The obtaining module 1610 is configured to obtain model training data, the model training data including a text feature sequence and a corresponding original speech sample sequence.

The training module 1620 is configured to input an original vector matrix formed by matching a text feature sample point in the text feature sample sequence with a speech sample point in the original speech sample sequence into a statistical parameter model for training.

The sample point prediction module 1630 is configured to perform non-linear mapping calculation on the original vector matrix in a hidden layer, to output a corresponding prediction speech sample point.

The modeling module 1640 is configured to determine a model parameter of the statistical parameter model according to the prediction speech sample point and a corresponding original speech sample point by using a smallest difference principle, to obtain a corresponding target statistical parameter model.

In this embodiment, the server trains an original vector matrix formed by matching a text feature sample point in a text feature sequence in training data with a speech sample point in an original speech sample sequence by using a statistical parameter model, performs non-linear mapping calculation on the original vector matrix in a hidden layer, to obtain a corresponding prediction speech sample point, compares the prediction speech sample point with a corresponding original speech sample point, and determines a model parameter of the statistical parameter model by using a smallest difference principle, to obtain a corresponding target statistical parameter model. The text feature sequence is directly sampled to obtain the text feature sample point, and the text feature sample point and a speech feature sample point are directly modeled, so that a speech feature does not need to be extracted, and loss of original information caused in a speech feature extraction process is avoided to the greatest extent, thereby improving saturation and naturalness of speech synthesized by using the statistical parameter model.

Figure 17:
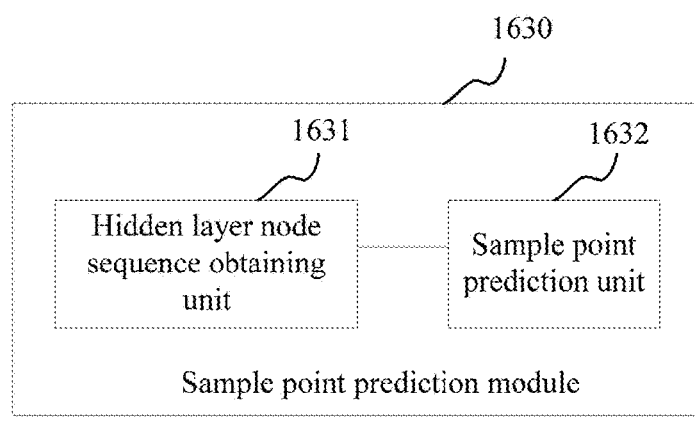
FIG. 17 is a structural block diagram of a sample point prediction module according to an embodiment.

As shown in FIG. 17, in an embodiment, the sample point prediction module 1630 includes:

a hidden layer node sequence obtaining unit 1631, configured to: obtain an input layer node sequence according to the original vector matrix, perform non-linear mapping on the input layer node sequence to obtain a hidden layer node sequence corresponding to a first hidden layer, and use the first hidden layer as a current processing hidden layer; and a sample point prediction unit 1632, configured to: obtain a current hidden layer node sequence corresponding to the current processing hidden layer, perform sampling and non-linear mapping on the current hidden layer node sequence according to a current processing hidden layer sampling interval to obtain a next hidden layer node sequence, use a next hidden layer of the current processing hidden layer as a current processing hidden layer, and repeatedly enter the sample point prediction unit, until a processing hidden layer quantity reaches a largest hidden layer quantity, to obtain a first prediction speech sample point, a next hidden layer sampling interval of the current processing hidden layer being a multiple of the current processing hidden layer sampling interval.

Figure 18:
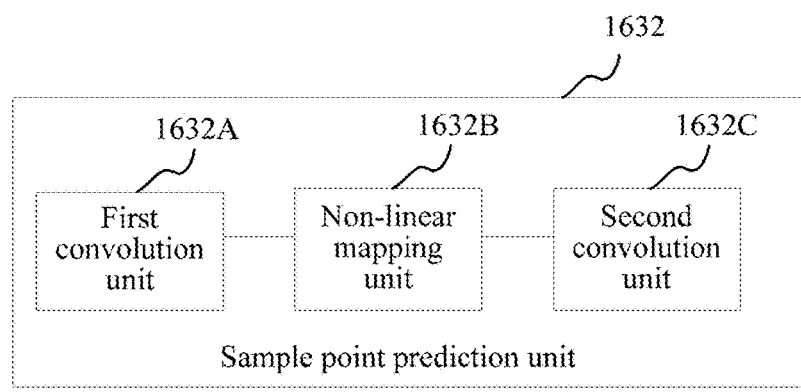
FIG. 18 is a structural block diagram of a sample point prediction unit according to an embodiment.

As shown in FIG. 18, in an embodiment, the sample point prediction unit 1632 includes:

a first convolution unit 1632A, configured to perform a first linear convolution operation on the current hidden layer node sequence after the sampling to obtain the first processing result;

a non-linear mapping unit 1632B, configured to: obtain a non-linear mapping function set, and separately perform non-linear mapping on the first processing result by using non-linear mapping functions in the non-linear mapping function set to obtain a non-linear mapping result set; and a second convolution unit 1632C, configured to: add non-linear mapping results in the non-linear mapping result set, and then perform a second linear convolution operation to obtain the next hidden layer node sequence.

In an embodiment, the non-linear mapping unit 1632B is further configured to: obtain a non-linear mapping function set, and separately perform non-linear mapping on the first processing result by using a tan h function and a sigmoid function in the non-linear mapping function set to obtain a non-linear mapping result set.

In an embodiment, the hidden layer node sequence an obtaining unit 1631 is further configured to obtain a supplementary text feature sample point and a corresponding supplementary speech sample point, match and add the supplementary text feature sample point and the corresponding supplementary speech sample point to the original vector matrix to obtain a supplementary vector matrix, obtain the input layer node sequence according to the supplementary vector matrix, perform non-linear mapping on the input layer node sequence to obtain the hidden layer node sequence corresponding to the first hidden layer, use the first hidden layer as the current processing hidden layer, and enter the sample point prediction unit, so that the sample point prediction units obtains a second prediction speech sample point.

The modeling module 1640 is further configured to determine the model parameter of the statistical parameter model according to the first prediction speech sample point, a corresponding first original speech sample point, the second prediction speech sample point, and a corresponding second original speech sample point by using a smallest difference principle, to obtain the corresponding target statistical parameter model.

Figure 19:
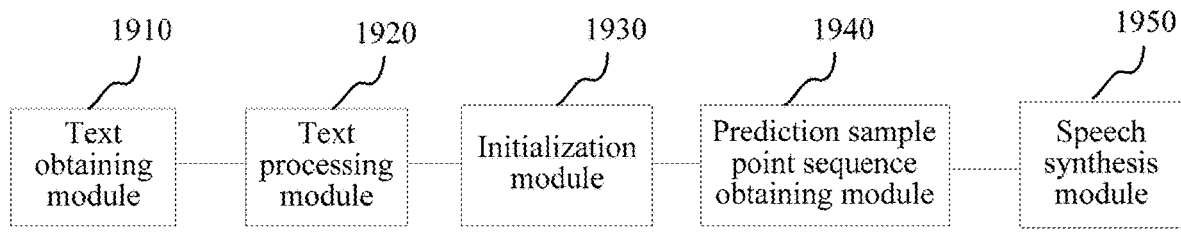
FIG. 19 is a structural block diagram of a server according to another embodiment.

As shown in FIG. 19, in another embodiment, a server is provided. An internal structure of the server may correspond to the structure shown in FIG. 2. All or some of the following modules may be implemented by using software, hardware, or a combination thereof. The server includes a text obtaining module 1910, a text processing module 1920, an initialization module 1930, a prediction sample point sequence obtaining module 1940, and a speech synthesis module 1950.

The text obtaining module 1910 is configured to obtain to-be-converted text information.

The text processing module 1920 is configured to process the to-be-converted text information to obtain a corresponding text feature sequence.

The initialization module 1930 is configured to obtain an initialized speech sample point and some text feature sample points in the text feature sequence, and match the initialized speech sample point with the text feature sample points to form an initialized vector matrix.

The prediction sample point sequence obtaining module 1940 is configured to input the initialized vector matrix into the target statistical parameter model in any one of the foregoing embodiments, to obtain a prediction speech sample point sequence corresponding to the text feature sequence.

The speech synthesis module 1950 is configured to output synthesized speech corresponding to the to-be-converted text information according to the prediction speech sample point sequence.

In this embodiment, the server processes text information to be converted into speech, to obtain a corresponding text feature sequence, samples the text feature sequence, to obtain a text feature sequence sample point, matches some of the obtained text feature sample points with an initialized speech sequence to form an initialized vector matrix, inputs the initialized vector matrix into a target statistical parameter model constructed according to the text sequence sample point and an original speech sample point, to obtain a prediction speech sample point sequence, and outputs synthesized speech corresponding to the to-be-converted text information according to the prediction speech sample point sequence. Text information to be converted into speech information is directly sampled, and then a text feature sample point sequence and initialized voice are input into a constructed target statistical model to obtain a prediction speech sample point sequence, so that feature extraction does not need to be performed on the to-be-converted text information, and loss of original information caused in a speech feature extraction process is avoided to the greatest extent. In addition, a prediction speech sample point is directly output without needing any a backend vocoder module, thereby improving naturalness and saturation of synthesized speech.

Figure 20:
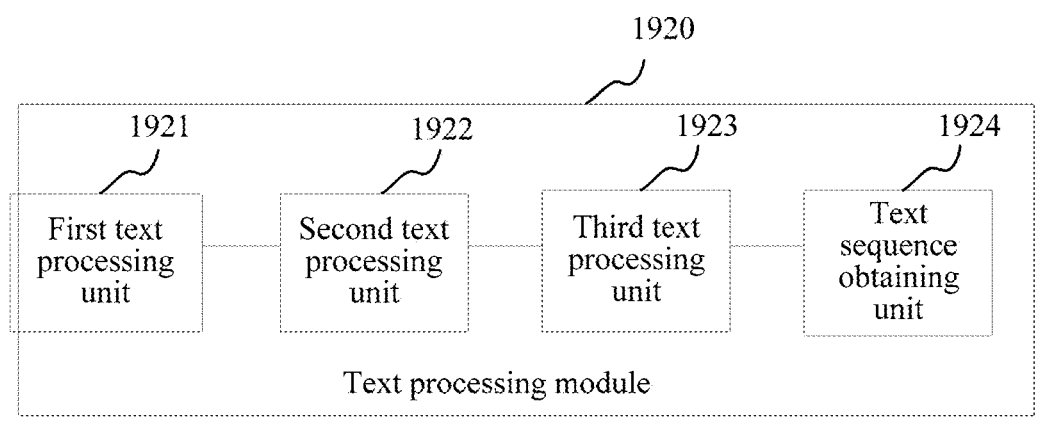
FIG. 20 is a structural block diagram of a text processing module according to an embodiment.

As shown in FIG. 20, in an embodiment, the text processing module 1920 includes:

a first text processing unit 1921, configured to perform statement segmentation and word segmentation processing on a paragraph in the to-be-converted text information, to obtain a first text feature sequence;

a second text processing unit 1922, configured to perform word segmentation and part-of-speech tagging processing on the to-be-converted text information to obtain a second text feature sequence;

a third text processing unit 1923, configured to: perform prosodic hierarchy prediction processing on the to-be-converted text information, generate pronunciation, and perform in least one processing of a heteronym, erhua, a neutral tone in the process of generating the pronunciation, to obtain a third text feature sequence; and a text sequence obtaining unit 1924, configured to generate a corresponding text feature sequence according to the first text feature sequence, the second text feature sequence, and the third text feature sequence.

Figure 21:
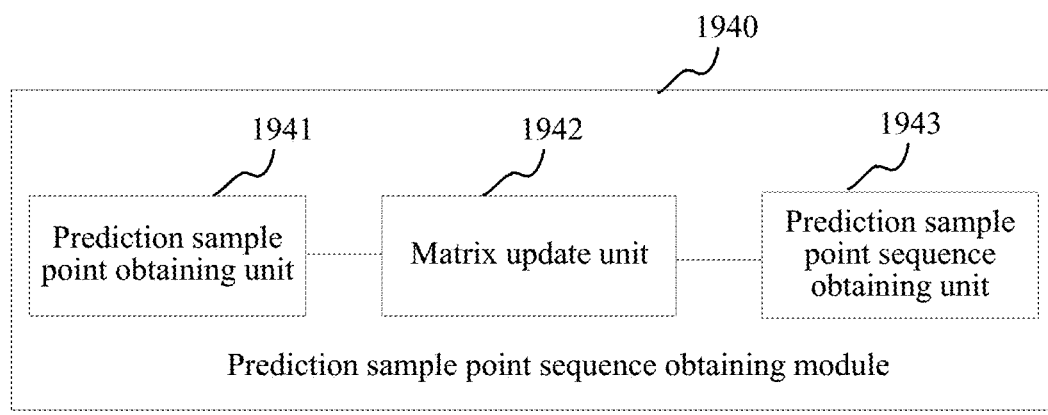
FIG. 21 is a structural block diagram of a prediction sample point sequence obtaining module according to an embodiment.

As shown in FIG. 21, in an embodiment, the prediction sample point sequence obtaining module 1940 includes:

a prediction sample point obtaining unit 1941, configured to input the initialized vector matrix into the target statistical parameter model in any one of the foregoing embodiments, to obtain a first prediction speech sample point;

a matrix update unit 1942, configured to: use the first prediction speech sample point as a current prediction sample point, obtain a target text feature sample point corresponding to the current prediction speech sample point from the text feature sequence, match the target text feature sample point with the current prediction speech sample point to form a vector pair, and add the vector pair to the initialized vector matrix to obtain an updated vector matrix; and a prediction sample point sequence obtaining unit 1943, configured to: input the updated vector matrix into the target statistical parameter model, to obtain a second prediction speech sample point, use the second prediction sample point as a current prediction sample point, and enter the matrix update unit, until all text feature sample points in the text feature sequence have corresponding prediction speech sample points, the prediction speech sample points forming a prediction speech sample point sequence.

A person of ordinary skill in the art can understand that all or some of the procedures in the methods of the foregoing embodiments may be implemented by a computer program instructing related hardware. The program may be stored in a non-volatile computer-readable storage medium. When the program is executed, the procedures of the embodiments of the foregoing methods may be performed. Any reference to a memory, storage, database, or other medium used in the various embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache memory. By way of illustration and not limitation, the RANI is available in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM), a rambus direct RAM (RDRAM), a direct rambus dynamic RAM (DRDRAM), and a rambus dynamic RAM (RDRAM).

The technical features of the embodiments described above may be randomly combined. For brevity of description, all possible combinations of the technical features in the foregoing embodiments are not described, however, as long as there is no contradiction in the combinations of these technical features, they should be considered as falling within the scope of this specification.

The embodiments described above are merely illustrative of several implementations of this application, and the description thereof is more specific and detailed, but cannot be construed as limiting the scope of the invention. It should be noted that some variations and modifications may be made by a person of ordinary skill in the art without departing from the spirit of this application, and all of the variations and modifications fall within the protection scope of this application. Therefore, the protection scope of this patent application should be subject to the appended claims.

What is claimed is:

1. A speech synthesis method performed at a server having one or more processors and memory storing a plurality of programs to be executed by the one or more processors, the method comprising:

obtaining, by the server, to-be-converted text information;

processing, by the server, the to-be-converted text information to obtain a corresponding text feature sequence;

obtaining, by the server, an initialized speech sample point and some text feature sample points in the text feature sequence, and matching the initialized speech sample point with the text feature sample points to form an initialized vector matrix;

inputting, by the server, the initialized vector matrix into a target statistical parameter model, to obtain a prediction speech sample point sequence corresponding to the text feature sequence, wherein the target statistical parameter model is generated by:

obtaining model training data, the model training data comprising a training text feature sequence and a corresponding training original speech sample sequence, generating an original vector matrix formed by matching a text feature sample point in the training text feature sample sequence with a speech sample point in the training original speech sample sequence;

inputting the original vector matrix into a statistical parameter model for training, performing non-linear mapping calculation on the original vector matrix in a hidden layer of the statistical parameter model, outputting a corresponding training prediction speech sample point from the statistical parameter model, and determining the target statistical parameter model by updating the statistical parameter model according to the training prediction speech sample point and a corresponding training original speech sample point by using a smallest difference principle;

the inputting further including:

inputting, by the server, the initialized vector matrix into the target statistical parameter model, to obtain a first prediction speech sample point;

using, by the server, the first prediction speech sample point as a current prediction sample point, obtaining a target text feature sample point corresponding to the current prediction speech sample point from the text feature sequence, matching the target text feature sample point with the current prediction speech sample point to form a vector pair, and adding the vector pair to the initialized vector matrix to obtain an updated vector matrix; and repeatedly performing the step of obtaining the target text feature sample point and matching the target text feature sample point with the current prediction speech sample point to form a vector pair, until all text feature sample points in the text feature sequence have corresponding prediction speech sample points, the prediction speech sample points forming a prediction speech sample point sequence; and outputting, by the server, synthesized speech corresponding to the to-be-converted text information according to the prediction speech sample point sequence.

2. The method according to claim 1, wherein the step of performing non-linear mapping calculation on the original vector matrix in a hidden layer of the statistical parameter model comprises:

obtaining, by the server, an input layer node sequence according to the original vector matrix, performing non-linear mapping on the input layer node sequence to obtain a hidden layer node sequence corresponding to a first hidden layer, and using the first hidden layer as a current processing hidden layer; and obtaining, by the server, a current hidden layer node sequence corresponding to the current processing hidden layer, performing sampling and non-linear mapping on the current hidden layer node sequence according to a current processing hidden layer sampling interval to obtain a next hidden layer node sequence, using a next hidden layer of the current processing hidden layer as a current processing hidden layer, and repeatedly performing the step of obtaining a current hidden layer node sequence corresponding to the current processing hidden layer, until a processing hidden layer quantity reaches a largest hidden layer quantity, to obtain a first prediction speech sample point, a next hidden layer sampling interval of the current processing hidden layer being a multiple of the current processing hidden layer sampling interval.

3. The method according to claim 2, wherein the step of performing sampling and non-linear mapping on the current hidden layer node sequence according to a current processing hidden layer sampling interval to obtain a next hidden layer node sequence comprises:

performing, by the server, a first linear convolution operation on the current hidden layer node sequence after the sampling to obtain the first processing result;

obtaining, by the server, a non-linear mapping function set, and separately performing non-linear mapping on the first processing result by using non-linear mapping functions in the non-linear mapping function set to obtain a non-linear mapping result set; and adding, by the server, non-linear mapping results in the non-linear mapping result set, and then performing a second linear convolution operation to obtain the next hidden layer node sequence.

4. The method according to claim 3, wherein the step of obtaining, by the server, a non-linear mapping function set, and separately performing non-linear mapping on the first processing result by using non-linear mapping functions in the non-linear mapping function set to obtain a non-linear mapping result set comprises:
obtaining, by the server, the non-linear mapping function set, and separately performing non-linear mapping on the first processing result by using a tan h function and a sigmoid function in the non-linear mapping function set to obtain the non-linear mapping result set.

5. The method according to claim 2, wherein the step of obtaining, by the server, an input layer node sequence according to the original vector matrix, performing non-linear mapping on the input layer node sequence to obtain a hidden layer node sequence corresponding to a first hidden layer, and using the first hidden layer as a current processing hidden layer comprises:
obtaining, by the server, a supplementary text feature sample point and a corresponding supplementary speech sample point, matching and adding the supplementary text feature sample point and the corresponding supplementary speech sample point to the original vector matrix to obtain a supplementary vector matrix, obtaining the input layer node sequence according to the supplementary vector matrix, performing non-linear mapping on the input layer node sequence to obtain the hidden layer node sequence corresponding to the first hidden layer, and using the first hidden layer as the current processing hidden layer; and performing the step of obtaining a current hidden layer node sequence corresponding to the current processing hidden layer, to obtain a second prediction speech sample point; and
the step of determining, by the server, a model parameter of the statistical parameter model according to the prediction speech sample point and a corresponding original speech sample point by using a smallest difference principle, to obtain a corresponding target statistical parameter model comprises:
determining, by the server, the model parameter of the statistical parameter model according to the first prediction speech sample point, a corresponding first original speech sample point, the second prediction speech sample point, and a corresponding second original speech sample point by using the smallest difference principle, to obtain the corresponding target statistical parameter model.

6. The method according to claim 1, wherein the step of processing, by the server, the to-be-converted text information to obtain a corresponding text feature sequence comprises:
performing, by the server, statement segmentation and word segmentation processing on a paragraph in the to-be-converted text information, to obtain a first text feature sequence;
performing, by the server, word segmentation and part-of-speech tagging processing on the to-be-converted text information to obtain a second text feature sequence;
performing, by the server, prosodic hierarchy prediction processing on the to-be-converted text information, generating pronunciation, and performing in least one processing of a heteronym, erhua, a neutral tone in the process of generating the pronunciation, to obtain a third text feature sequence; and
generating, by the server, a corresponding text feature sequence according to the first text feature sequence, the second text feature sequence, and the third text feature sequence.

7. A server, comprising a memory and a processor, the memory storing a plurality of computer-readable instructions that, when executed by the processor, cause the server to perform the following steps:
obtaining, by the server, to-be-converted text information;
processing, by the server, the to-be-converted text information to obtain a corresponding text feature sequence;
obtaining, by the server, an initialized speech sample point and some text feature sample points in the text feature sequence, and matching the initialized speech sample point with the text feature sample points to form an initialized vector matrix;
inputting, by the server, the initialized vector matrix into a target statistical parameter model, to obtain a prediction speech sample point sequence corresponding to the text feature sequence, wherein the target statistical parameter model is generated by:
obtaining model training data, the model training data comprising a training text feature sequence and a corresponding training original speech sample sequence,
generating an original vector matrix formed by matching a text feature sample point in the training text feature sample sequence with a speech sample point in the training original speech sample sequence;
inputting the original vector matrix into a statistical parameter model for training,
performing non-linear mapping calculation on the original vector matrix in a hidden layer of the statistical parameter model,
outputting a corresponding training prediction speech sample point from the statistical parameter model, and
determining the target statistical parameter model by updating the statistical parameter model according to the training prediction speech sample point and a corresponding training original speech sample point by using a smallest difference principle;
the inputting further including:
inputting, by the server, the initialized vector matrix into the target statistical parameter model, to obtain a first prediction speech sample point;
using, by the server, the first prediction speech sample point as a current prediction sample point, obtaining a target text feature sample point corresponding to the current prediction speech sample point from the text feature sequence, matching the target text feature sample point with the current prediction speech sample point to form a vector pair, and adding the vector pair to the initialized vector matrix to obtain an updated vector matrix; and
repeatedly performing the step of obtaining a target text feature sample point and matching the target text feature sample point with the current prediction speech sample point to form a vector pair, until all text feature sample points in the text feature sequence have corresponding prediction speech sample points, the prediction speech sample points forming a prediction speech sample point sequence; and outputting, by the server, synthesized speech corresponding to the to-be-converted text information according to the prediction speech sample point sequence.

8. The server according to claim 7, wherein the step of performing non-linear mapping calculation on the original vector matrix in a hidden layer of the statistical parameter model comprises:
   obtaining, by the server, an input layer node sequence according to the original vector matrix, performing non-linear mapping on the input layer node sequence to obtain a hidden layer node sequence corresponding to a first hidden layer, and using the first hidden layer as a current processing hidden layer; and
   obtaining, by the server, a current hidden layer node sequence corresponding to the current processing hidden layer, performing sampling and non-linear mapping on the current hidden layer node sequence according to a current processing hidden layer sampling interval to obtain a next hidden layer node sequence, using a next hidden layer of the current processing hidden layer as a current processing hidden layer, and repeatedly performing the step of obtaining a current hidden layer node sequence corresponding to the current processing hidden layer, until a processing hidden layer quantity reaches a largest hidden layer quantity, to obtain a first prediction speech sample point, a next hidden layer sampling interval of the current processing hidden layer being a multiple of the current processing hidden layer sampling interval.

9. The server according to claim 8, wherein the step of performing sampling and non-linear mapping on the current hidden layer node sequence according to a current processing hidden layer sampling interval to obtain a next hidden layer node sequence comprises:
   performing, by the server, a first linear convolution operation on the current hidden layer node sequence after the sampling to obtain the first processing result;
   obtaining, by the server, a non-linear mapping function set, and separately performing non-linear mapping on the first processing result by using non-linear mapping functions in the non-linear mapping function set to obtain a non-linear mapping result set; and
   adding, by the server, non-linear mapping results in the non-linear mapping result set, and then performing a second linear convolution operation to obtain the next hidden layer node sequence.

10. The server according to claim 9, wherein the step of obtaining, by the server, a non-linear mapping function set, and separately performing non-linear mapping on the first processing result by using non-linear mapping functions in the non-linear mapping function set to obtain a non-linear mapping result set comprises:
   obtaining, by the server, the non-linear mapping function set, and separately performing non-linear mapping on the first processing result by using a tan h function and a sigmoid function in the non-linear mapping function set to obtain the non-linear mapping result set.

11. The server according to claim 8, wherein the step of obtaining, by the server, an input layer node sequence according to the original vector matrix, performing non-linear mapping on the input layer node sequence to obtain a hidden layer node sequence corresponding to a first hidden layer, and using the first hidden layer as a current processing hidden layer comprises:
   obtaining, by the server, a supplementary text feature sample point and a corresponding supplementary speech sample point, matching and adding the supplementary text feature sample point and the corresponding supplementary speech sample point to the original vector matrix to obtain a supplementary vector matrix, obtaining the input layer node sequence according to the supplementary vector matrix, performing non-linear mapping on the input layer node sequence to obtain the hidden layer node sequence corresponding to the first hidden layer, and using the first hidden layer as the current processing hidden layer; and performing the step of obtaining a current hidden layer node sequence corresponding to the current processing hidden layer, to obtain a second prediction speech sample point; and
   the step of determining, by the server, a model parameter of the statistical parameter model according to the prediction speech sample point and a corresponding original speech sample point by using a smallest difference principle, to obtain a corresponding target statistical parameter model comprises:
   determining, by the server, the model parameter of the statistical parameter model according to the first prediction speech sample point, a corresponding first original speech sample point, the second prediction speech sample point, and a corresponding second original speech sample point by using the smallest difference principle, to obtain the corresponding target statistical parameter model.

12. The server according to claim 7, wherein the step of processing, by the server, the to-be-converted text information to obtain a corresponding text feature sequence comprises:
   performing, by the server, statement segmentation and word segmentation processing on a paragraph in the to-be-converted text information, to obtain a first text feature sequence;
   performing, by the server, word segmentation and part-of-speech tagging processing on the to-be-converted text information to obtain a second text feature sequence;
   performing, by the server, prosodic hierarchy prediction processing on the to-be-converted text information, generating pronunciation, and performing in least one processing of a heteronym, erhua, a neutral tone in the process of generating the pronunciation, to obtain a third text feature sequence; and
   generating, by the server, a corresponding text feature sequence according to the first text feature sequence, the second text feature sequence, and the third text feature sequence.

13. A non-volatile computer readable storage medium, storing a plurality of computer-readable instructions that, when executed by one or more processors of a server, cause the server to perform the following steps:
   obtaining, by the server, to-be-converted text information;
   processing, by the server, the to-be-converted text information to obtain a corresponding text feature sequence;
   obtaining, by the server, an initialized speech sample point and some text feature sample points in the text feature sequence, and matching the initialized speech sample point with the text feature sample points to form an initialized vector matrix;
   inputting, by the server, the initialized vector matrix into a target statistical parameter model, to obtain a prediction speech sample point sequence corresponding to the text feature sequence, wherein the target statistical parameter model is generated by:

obtaining model training data, the model training data comprising a training text feature sequence and a corresponding training original speech sample sequence, generating an original vector matrix formed by matching a text feature sample point in the training text feature sample sequence with a speech sample point in the training original speech sample sequence;

inputting the original vector matrix into a statistical parameter model for training, performing non-linear mapping calculation on the original vector matrix in a hidden layer of the statistical parameter model, outputting a corresponding training prediction speech sample point from the statistical parameter model, and determining the target statistical parameter model by updating the statistical parameter model according to the training prediction speech sample point and a corresponding training original speech sample point by using a smallest difference principle;

the inputting further including:

inputting, by the server, the initialized vector matrix into the target statistical parameter model, to obtain a first prediction speech sample point;

using, by the server, the first prediction speech sample point as a current prediction sample point, obtaining a target text feature sample point corresponding to the current prediction speech sample point from the text feature sequence, matching the target text feature sample point with the current prediction speech sample point to form a vector pair, and adding the vector pair to the initialized vector matrix to obtain an updated vector matrix; and repeatedly performing the step of obtaining the target text feature sample point and matching the target text feature sample point with the current prediction speech sample point to form a vector pair, until all text feature sample points in the text feature sequence have corresponding prediction speech sample points, the prediction speech sample points forming a prediction speech sample point sequence; and outputting, by the server, synthesized speech corresponding to the to-be-converted text information according to the prediction speech sample point sequence.

14. The non-volatile computer readable storage medium according to claim 13, wherein the step of processing, by the server, the to-be-converted text information to obtain a corresponding text feature sequence comprises:

performing, by the server, statement segmentation and word segmentation processing on a paragraph in the to-be-converted text information, to obtain a first text feature sequence;

performing, by the server, word segmentation and part-of-speech tagging processing on the to-be-converted text information to obtain a second text feature sequence;

performing, by the server, prosodic hierarchy prediction processing on the to-be-converted text information, generating pronunciation, and performing in least one processing of a heteronym, erhua, a neutral tone in the process of generating the pronunciation, to obtain a third text feature sequence; and generating, by the server, a corresponding text feature sequence according to the first text feature sequence, the second text feature sequence, and the third text feature sequence.

* * * * *